(12) United States Patent
Jin et al.

(10) Patent No.: US 11,128,535 B2
(45) Date of Patent: Sep. 21, 2021

(54) COMPUTER SYSTEM AND DATA MANAGEMENT METHOD

(71) Applicant: HITACHI, LTD., Tokyo (JP)

(72) Inventors: Azusa Jin, Tokyo (JP); Hideo Saito, Tokyo (JP); Takaki Nakamura, Tokyo (JP); Masakuni Agetsuma, Tokyo (JP); Tsukasa Shibayama, Tokyo (JP)

(73) Assignee: HITACHI, LTD., Tokyo (JP)

( * ) Notice: Subject to any disclaimer, the term of this patent is extended or adjusted under 35 U.S.C. 154(b) by 44 days.

(21) Appl. No.: 16/560,302

(22) Filed: Sep. 4, 2019

(65) Prior Publication Data
US 2020/0304373 A1    Sep. 24, 2020

(30) Foreign Application Priority Data
Mar. 19, 2019  (JP) .............................. JP2019-051435

(51) Int. Cl.
| | | |
|---|---|---|
| G06F 15/16 | (2006.01) | |
| H04L 12/24 | (2006.01) | |
| G06F 11/20 | (2006.01) | |
| H04L 29/08 | (2006.01) | |

(52) U.S. Cl.
CPC ...... H04L 41/0893 (2013.01); G06F 11/2094 (2013.01); H04L 67/1076 (2013.01); H04L 67/1097 (2013.01)

(58) Field of Classification Search
CPC ............. G06F 11/2094; G06F 11/2097; H04L 41/0893; H04L 67/1076; H04L 67/1097
USPC ........................................................ 709/223
See application file for complete search history.

(56) References Cited

U.S. PATENT DOCUMENTS

| | | | | |
|---|---|---|---|---|
| 7,509,645 | B2 * | 3/2009 | Coates | ................ G06F 3/0613 718/105 |
| 9,354,683 | B2 * | 5/2016 | Patiejunas | ............. G06F 1/3268 |
| 9,767,098 | B2 * | 9/2017 | Patiejunas | ............. G06F 16/113 |
| 9,767,129 | B2 * | 9/2017 | Patiejunas | ........... G06F 16/2228 |
| 10,157,199 | B2 * | 12/2018 | Patiejunas | ............... G06F 16/21 |
| 2004/0078466 | A1 * | 4/2004 | Coates | ................ H04L 67/1002 709/226 |
| 2010/0228915 | A1 * | 9/2010 | Ogihara | ............. G06F 11/2094 711/114 |
| 2011/0208996 | A1 * | 8/2011 | Hafner | .................... G06F 9/466 714/6.24 |

(Continued)

FOREIGN PATENT DOCUMENTS

WO    2016/052665 A1    4/2016

*Primary Examiner* — Moustafa M Meky
*Assistant Examiner* — Thorne E Waugh
(74) *Attorney, Agent, or Firm* — Volpe Koenig

(57) ABSTRACT

A computer system includes: a storage device; storage area management units that provide a storage area, based on the storage device to a data management unit having a data protection function for achieving availability of a system providing a service, and have a data control function for the storage area; and a control unit that manages arrangement of the storage area and a data control policy applied to the storage area. The control unit acquires setting information about the availability of the system providing the service and performance of the service and determines the data control policy applied to the storage area, based on the setting information. The storage area management units control the storage area, based on the data control policy.

12 Claims, 15 Drawing Sheets

(56) References Cited

U.S. PATENT DOCUMENTS

2014/0185429 A1* 7/2014 Takase .................... H04L 45/30
370/225
2016/0371145 A1* 12/2016 Akutsu .................. G06F 3/067

* cited by examiner

FIG. 4

| CLUSTER ID 401 | COMPUTER NODE ID 402 | CONTAINER ID 403 | STORAGE NODE ID 404 | VOLUME ID 405 | CAPACITY 406 | IO LOAD 407 |
|---|---|---|---|---|---|---|
| 0 | CMP-01 | CTR-101 | STR-01 | 10 | 5TB | Hot |
| 0 | CMP-02 | CTR-102 | STR-01 | 20 | 5TB | Cold |
| 0 | CMP-03 | CTR-103 | STR-01 | 30 | 5TB | Cold |
| 1 | CMP-04 | CTR-201 | STR-02 | 10 | 10TB | Cold |
| 1 | CMP-05 | CTR-202 | STR-03 | 20 | 10TB | Cold |
| 1 | CMP-06 | CTR-203 | STR-04 | 30 | 10TB | Cold |
| ... | ... | ... | ... | ... | ... | ... |

| CLUSTER ID 501 | REPLICATION COUNT 502 | MODE 503 | CONTAINER ID 504 | MIDDLEWARE 505 | ATTRIBUTE 506 | 212 |
|---|---|---|---|---|---|---|
| 0 | 3 | PERFORMANCE ORIENTED | CTR-101 | Middleware A | Primary | |
| | | | CTR-102 | Middleware A | Secondary | |
| | | | CTR-103 | Middleware A | Secondary | |
| 1 | 3 | CAPACITY ORIENTED | CTR-201 | Middleware B | Data Node | |
| | | | CTR-202 | Middleware B | Data Node | |
| | | | CTR-203 | Middleware B | Data Node | |
| ... | ... | ... | ... | ... | ... | |

FIG. 6

| VOLUME ID 601 | CAPACITY 602 | DATA CONTROL POLICY 603 | DATA PROTECTION LEVEL 604 | DEDUPLICATION PATTERN 605 |
|---|---|---|---|---|
| 10 | 10TB | Dedupe+EC | 4D+2P | INLINE |
| 20 | 5TB | Dedupe+EC | 2D+1P | POST PROCESS |
| 30 | 5TB | No Protection | - | - |
| 40 | 8TB | Mirroring | - | - |
| 50 | 10TB | EC | 4D+2P | - |

311

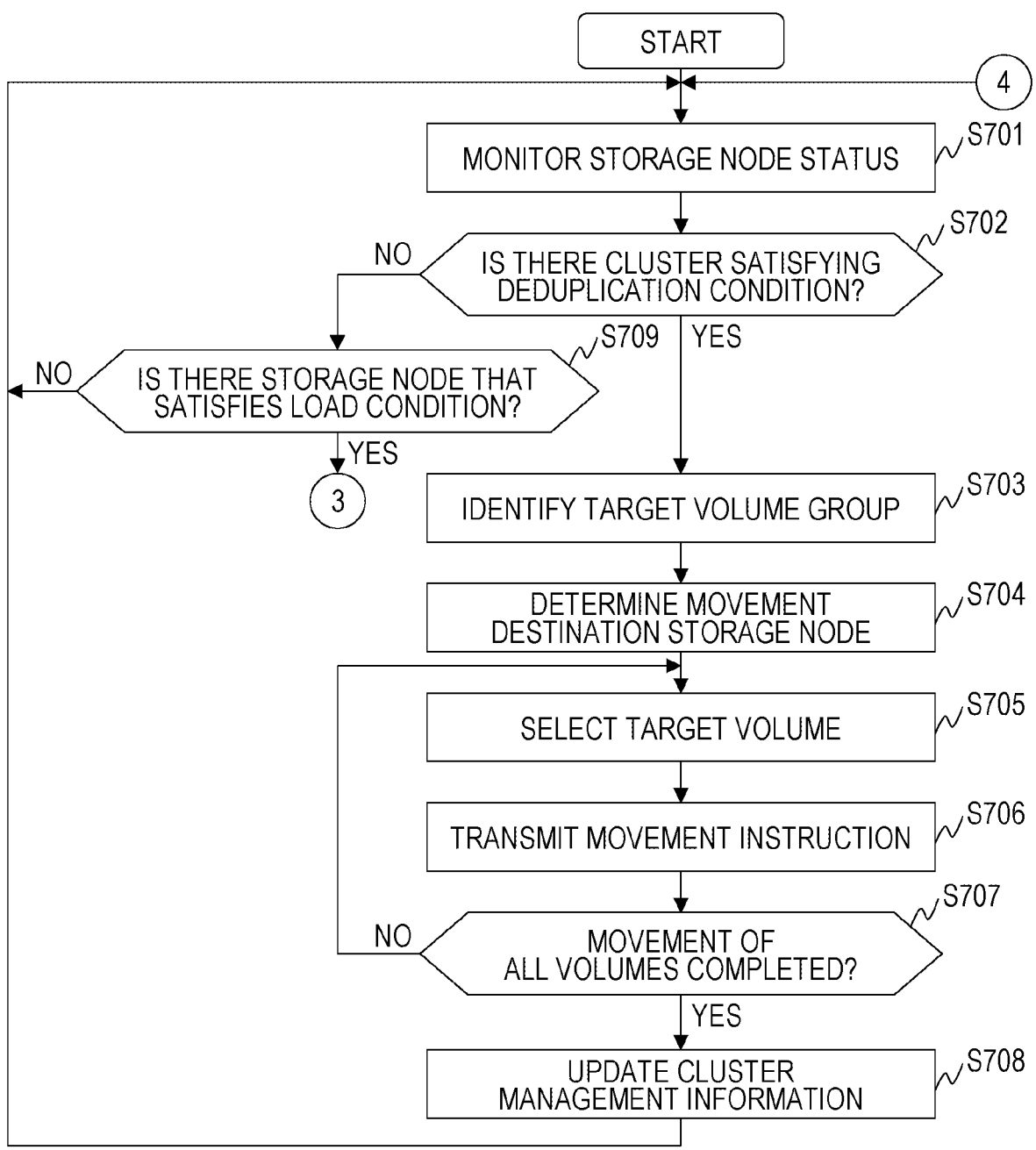

COMPUTER SYSTEM AND DATA MANAGEMENT METHOD

CLAIM OF PRIORITY

The present application claims priority from Japanese patent application JP 2019-051435 filed on Mar. 19, 2019, the content of which is hereby incorporated by reference into this application.

BACKGROUND OF THE INVENTION

1. Field of the Invention

The present invention relates to control for storage areas.

2. Description of the Related Art

In recent years, services have been provided that make use of various types of data to provide novel insight and the like. Such services require a large amount of data to be stored and managed. In view of this, a computer system is provided that features cooperation between a node on which middleware in charge of management of storage and access of data used in a business system operates and a node on which storage management software that manages a storage area that stores the data used in the business system operates.

The middleware has a data protection function to create redundant data using a replication function or the like, and the storage management software has a data protection function to create redundant data using an Erasure Coding function and a Mirroring function. Business systems (services) with high availability can be implemented by using these data protection functions.

For example, WO2016/052665 discloses the following technique "A first node group including at least three nodes is predefined in a distributed storage system. Each node of the first node group is configured to send data blocks stored in storage devices managed by the node to other nodes belonging to the first node group. A first node is configured to receive data blocks from two or more other nodes in the first node group. The first node is configured to create a redundant code using a combination of data blocks received from the two or more other nodes and store the created redundant code to a storage device different from storage devices holding the data blocks used to create the redundant code. Combinations of data blocks used to create at least two redundant codes in redundant codes created by the first node are different in combination of logical addresses of constituent data blocks".

SUMMARY OF THE INVENTION

When a data protection function of each of the middleware and the storage management software is used, a large amount of storage capacity is required for storing data. For example, when the replication function of the middleware and the Mirroring function of the storage management software are activated in order to duplicate data, a storage capacity that is four times as large as the amount of original data is required. In addition, the performance and quality of the service may be compromised due to the processing load of the data protection function and the like.

Storage capacity consumption can be reduced with the data protection function of the middleware deactivated by changing the setting of the middleware or by other means so that only the erasure coding function of the storage software is activated. However, the deactivation of the data protection function of middleware may result in failure to guarantee the availability of the business system against failure of the middleware layer. In addition, the setting change of middleware requires a huge cost and thus is not practical.

The following is a representative example of the invention disclosed in the present application. That is, a computer system includes: a storage device; storage area management units that provide a storage area, based on the storage device to a data management unit having a data protection function for achieving availability of a system providing a service, and have a data control function for the storage area; and a control unit that manages arrangement of the storage area and a data control policy applied to the storage area. The control unit acquires first setting information about the availability of the system providing the service and performance of the service and determines the data control policy applied to the storage area, based on the first setting information. The storage area management units control the storage area, based on the data control policy.

One aspect of the present invention can achieve data control effectively utilizing a storage capacity while maintaining the availability of a system providing a service, without changing settings of middleware (data management unit). Tasks, configurations, and advantageous effects other than those described above will be apparent from the following description on embodiments.

BRIEF DESCRIPTION OF THE DRAWINGS

FIG. 4 is a diagram illustrating an example of a data structure of cluster management information according to the first embodiment;

FIG. 5 is a diagram illustrating an example of the data structure of middleware management information according to the first embodiment;

FIG. 6 is a diagram illustrating an example of a data structure of volume management information according to the first embodiment;

FIG. 13A is a flowchart illustrating an example of volume movement determination processing executed by the controller node according to the first embodiment;

DESCRIPTION OF THE PREFERRED EMBODIMENTS

Figure 1:
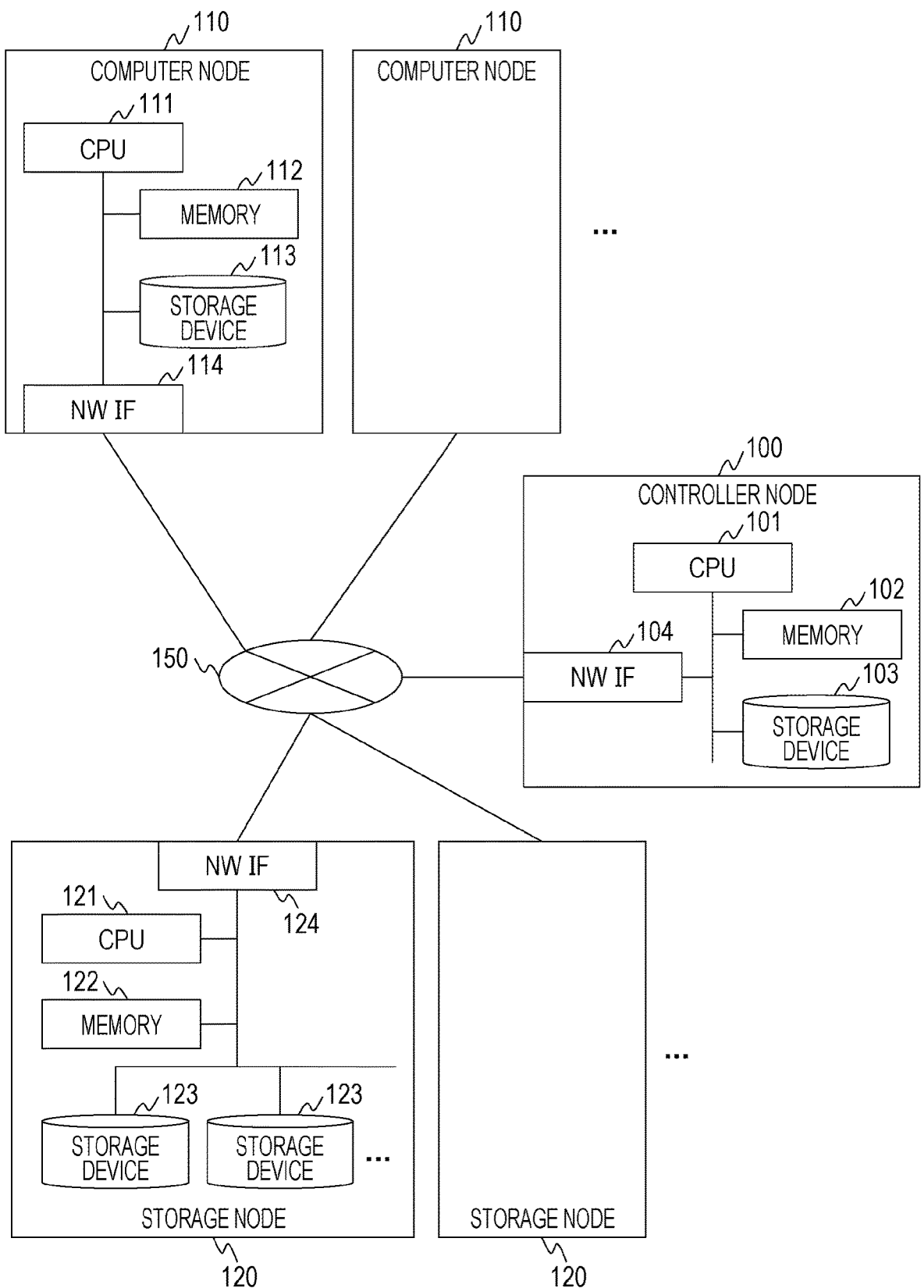
FIG. 1 is a diagram illustrating an example of a configuration of a computer system according to a first embodiment.

Hereinafter, embodiments of the present invention will be described with reference to the drawings. However, the present invention should not be construed as being limited to the description on the embodiments given below. Those skilled in the art can easily understand that the specific configuration can be changed without departing from the spirit or the gist of the present invention.

In the configurations of the invention described below, the same or similar configurations or functions are denoted by the same reference numerals, and overlapping descriptions will be omitted.

In the present specification and the like, the notations "first", "second", "third" and the like are used for identifying the components, and do not necessarily limit the quantity or order of the components.

For the sake of understanding of the invention, the positions, sizes, shapes, ranges, and the like of the components shown in the drawings and the like may not represent actual positions, sizes, shapes, ranges, and the like. Thus, the present invention is not limited to the position, size, shape, range, and the like disclosed in the drawings and the like.

First Embodiment

FIG. 1 is a diagram illustrating an example of a configuration of a computer system according to a first embodiment.

The computer system includes a controller node 100, a plurality of computer nodes 110, and a plurality of storage nodes 120. The controller node 100, the plurality of computer nodes 110, and the plurality of storage nodes 120 are connected to one another via a network 150.

The network 150 may be a Wide Area Network (WAN), a Local Area Network (LAN), a Storage Area Network (SAN), or the like. The network 150 may employ a wireless or wired connection scheme. A network connecting the computer node 110 and the storage node 120 to each other, a network connecting the controller node 100 and the computer node 110 to each other, and a network connecting the controller node 100 and the storage node 120 to each other may be different types of networks and may employ different connection schemes.

The controller node 100 is a node on which a program for managing a volume (storage area) provided to the computer node 110 operates.

The controller node 100 includes a Central Processing Unit (CPU) 101, a memory 102, a storage device 103, and a network interface 104. These pieces of hardware are connected to one another via a bus. The controller node 100 may have an input device such as a keyboard, a mouse, and a touch panel, as well as an output device such as a display and a printer.

The CPU 101 executes a program stored in the memory 102. The CPU 101 executes processing according to a program, to operate as a module that implements a specific function. In the following, descriptions on processing with a program as a subject indicate that the CPU 101 is executing the program.

The memory 102 stores programs executed by the CPU 101 and information. The memory 102 also includes a work area used by the program. Details of the programs and the information stored in the memory 102 will be described with reference to FIG. 2.

The storage device 103 is a device such as a Hard Disk Drive (HDD) or a Solid State Drive (SSD) that permanently stores data. The programs and information stored in the memory 102 may be stored in the storage device 103. In such a case, the CPU 101 reads a program and information from the storage device 103, loads the program and information onto the memory 102, and executes the loaded program.

The network interface 104 is an interface for connecting to another node via the network 150.

The computer node 110 is a node that operates middleware (not illustrated) that provides a service for controlling data storage and access. At least one of the computer nodes 110 forms a business system. The middleware is assumed to have a data protection function to create redundant data using a replication function or the like.

The computer node 110 includes a CPU 111, a memory 112, a storage device 113, and a network interface 114. These pieces of hardware are connected to one another via a bus. The computer node 110 may have an input device and an output device.

The CPU 111, the memory 112, the storage device 113, and the network interface 114 are hardware similar to the CPU 101, the memory 102, the storage device 103, and the network interface 104.

The storage node 120 is a node on which a program operates to provide a volume for storing data to the computer node 110. A plurality of the storage nodes 120 form a storage system. The program operating on the storage node 120 has a data protection function and a data control function. The data protection function is for creating redundant data by using an Erasure Coding function and a Mirroring function. The data control function includes a data capacity saving function such as deduplication processing and compression processing.

The storage node 120 includes a CPU 121, a memory 122, a plurality of storage devices 123, and a network interface 124. These pieces of hardware are connected to one another via a bus.

The CPU 121, the memory 122, the storage device 123, and the network interface 124 are hardware similar to the CPU 101, the memory 102, the storage device 103, and the network interface 104. The programs and the information stored in the memory 122 will be described in detail below with reference to FIG. 3.

The storage node 120 generates a Redundant Arrays of Inexpensive Disks (RAID) group from the plurality of storage devices 123, and generates a volume (logical device (LDEV) for example) provided to the computer node 110 from the RAID group. The plurality of storage nodes 120 may cooperate to manage the storage areas as a pool. The volume includes a storage area in units of logical units (LUs) or a storage area in units of pages.

In the description on the first embodiment, one computer node 110 is one computer (for example, bare metal server). However, this should not be construed in a limiting sense. For example, the computer node 110 may be a virtual computer or a container. In this case, one computer includes a plurality of the computer nodes 110. Thus, a plurality of pieces of middleware operate on one computer.

In the description on the first embodiment, one storage node 120 is one storage device. However, this should not be construed in a limiting sense. For example, the storage node 120 may be a virtual storage device. In this case, one storage device includes a plurality of the storage nodes 120. Thus, a plurality of storage management programs operate on one storage device.

The computer node 110 and the storage node 120 are described as separate configurations. However, this should not be construed in a limiting sense. The computer node 110 and the storage node 120 may be integrated into a single configuration. For example, a Hyper Converged Infrastructure in which a computer and a storage device are integrated may be employed.

Figure 2:
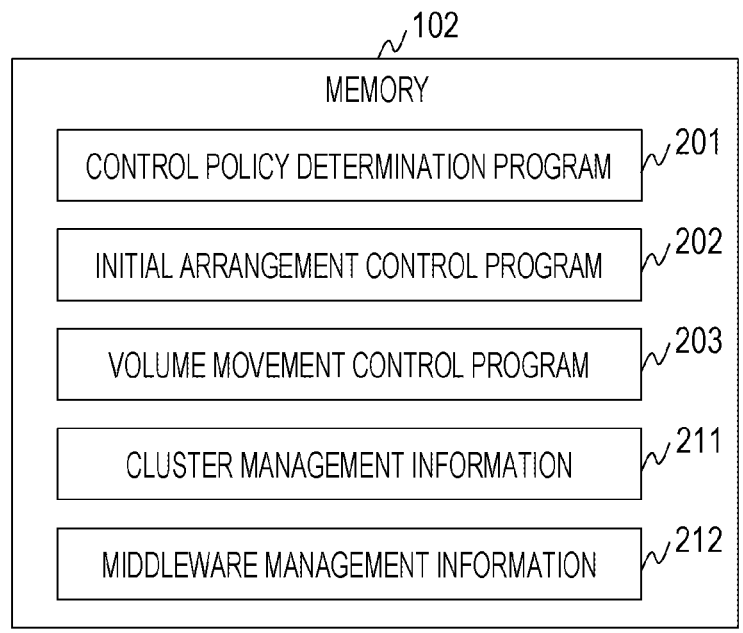
FIG. 2 is a diagram illustrating an example of programs and information stored in a memory of a controller node according to the first embodiment.

FIG. 2 is a diagram illustrating an example of programs and information stored in the memory 102 of the controller node 100 according to the first embodiment.

The memory 102 stores a control policy determination program 201, an initial arrangement control program 202, a volume movement control program 203, cluster management information 211, and middleware management information 212. The memory 102 may store programs and information not illustrated.

The control policy determination program 201 is a program for determining the data control policy of the storage node 120 to be applied to the storage area allocated to the computer node 110 (middleware).

The initial arrangement control program 202 is a program for controlling the arrangement of volumes to be newly generated.

The volume movement control program 203 is a program for controlling movement of volumes. The volume movement control program 203 monitors occurrence of an event, and controls movement of a volume when the occurrence of the event is detected. Specifically, the volume movement control program 203 monitors the storage node 120, and determines, based on the monitoring result, whether any of a deduplication condition and a load condition is satisfied.

The cluster management information 211 is information for managing a group (cluster) of the computer nodes 110 forming one business system. Details of the data structure of the cluster management information 211 will be described with reference to FIG. 4.

The middleware management information 212 is information for managing middleware operating on the computer node 110. Details of the data structure of the middleware management information 212 will be described with reference to FIG. 5.

Note that each program of the controller node 100 may be configured as follows. Specifically, a plurality of programs may be put together into one program, or one program may be divided into several programs corresponding to respective functions. For example, the control policy determination program 201, the initial arrangement control program 202, and the volume movement control program 203 may be integrated into one control program.

Figure 3:
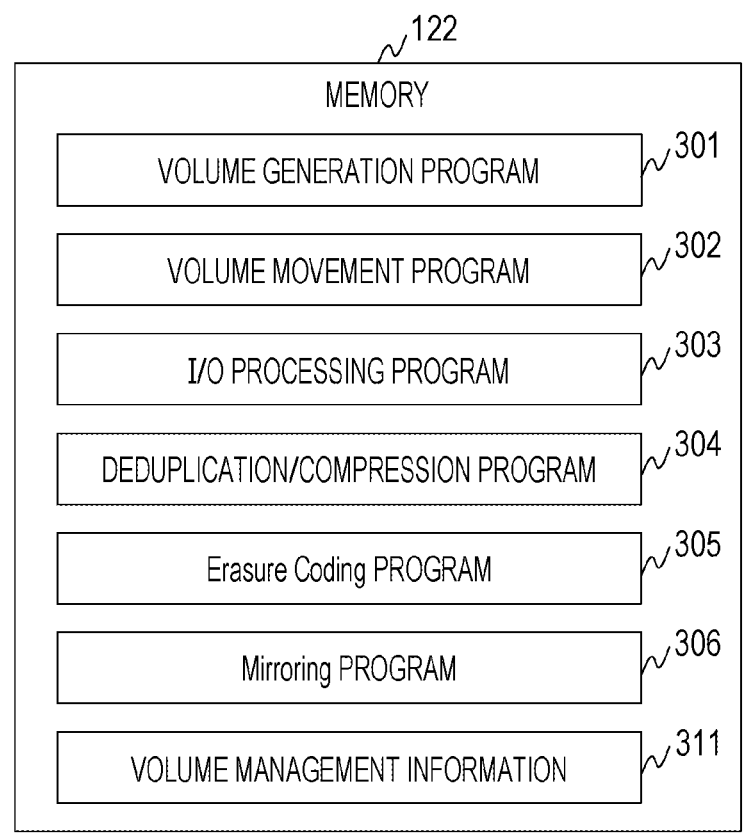
FIG. 3 is a diagram illustrating an example of programs and information stored in a memory of a storage node according to the first embodiment.

FIG. 3 is a diagram illustrating an example of programs and information stored in the memory 122 of the storage node 120 according to the first embodiment.

The memory 122 stores a volume generation program 301, a volume movement program 302, an I/O processing program 303, a deduplication/compression program 304, an Erasure Coding program 305, a Mirroring program 306, and volume management information 311. The memory 122 may store programs and information that are not illustrated in the figure.

The volume generation program 301 is a program for generating a volume.

The volume movement program 302 is a program for moving a volume.

The I/O processing program 303 is a program that performs I/O processing on a volume.

The deduplication/compression program 304 is a program that erases duplicated data and compresses data in order to save the data capacity.

The Erasure Coding program 305 is a program for writing and reading data using Erasure Coding.

The Mirroring program 306 is a program that writes data using Mirroring.

The volume management information 311 is information for managing a volume. Details of the data structure of the volume management information 311 will be described with reference to FIG. 6.

Note that each program of the storage node 120 may be configured as follows. Specifically, a plurality of programs may be put together into one program, or one program may be divided into several programs corresponding to respective functions. For example, the volume generation program 301, the volume movement program 302, the I/O processing program 303, the deduplication/compression program 304, the Erasure Coding program 305, and the Mirroring program 306 may be integrated into a single storage area management program.

FIG. 4 is a diagram illustrating an example of a data structure of the cluster management information 211 according to the first embodiment.

The cluster management information 211 stores an entry including a cluster ID 401, a computer node ID 402, a container ID 403, a storage node ID 404, a volume ID 405, a capacity 406, and an IO load 407.

The cluster ID 401 is a field for storing identification information about a cluster. For example, a numerical value is stored in the cluster ID 401. The cluster identification information may be set by the controller node 100 or may be manually set by a user operating a business system.

The computer node ID 402 is a field for storing identification information about the computer node 110. For example, a model number, an identifier, and the like of the computer node 110 are stored in the computer node ID 402. The identification information about the computer node 110 may be set by the controller node 100 or may be manually set by the user operating the business system.

The container ID 403 is a field for storing identification information about a container (not illustrated) on which the middleware operates. For example, an identifier of the container and the like are stored in the container ID 403. The identification information about the container may be set by the controller node 100, or may be manually set by the user operating the business system.

The storage node ID 404 is a field for storing identification information about the storage node 120 that provides a volume to the computer node 110. For example, a model number, an identifier, and the like of the storage node ID 404 are stored in the storage node ID 404. The identification information about the computer node 110 may be set by the controller node 100 or may be manually set by the user operating the storage system.

The volume ID 405 is a field for storing identification information about a volume provided to the computer node 110. For example, a numerical value is stored in the volume ID 405. The identification information about the volume may be set by the storage node 120 or may be manually set by the user operating the storage system. The identification information about a volume is information for identifying the volume in the storage node 120, and thus might overlap between the storage nodes 120.

The capacity 406 is a field for storing the capacity of a volume.

The IO load 407 is a field for storing information indicating the IO load on a volume. One of "Hot" or "Cold" is stored in the IO load 407 according to the present embodiment. Note that "Hot" corresponds to a state where an IO request is frequently received, and "Cold" corresponds to a state with no IO request or a small number of IO requests. For example, if the number of IO requests per unit time is larger than a threshold, "Hot" is set to the IO load 407, and if the number of IO requests per unit time is equal to or smaller than the threshold, "Cold" is set to the IO load 407. The value stored in the IO load 407 is an example and should not be construed in a limiting sense. For example, the number of IO requests nay be stored in the IO load 407.

In the first embodiment, the entry includes the container ID 403 because one middleware operates on one container. When one middleware operates on one computer node 110, the container ID 403 is not included in the entry. When one middleware operates on one virtual computer, the entry includes a virtual computer ID instead of the container ID 403.

FIG. 5 is a diagram illustrating an example of the data structure of the middleware management information 212 according to the first embodiment.

The middleware management information 212 stores an entry including a cluster ID 501, a replication count 502, a mode 503, a container ID 504, middleware 505, and an attribute 506.

The cluster ID 501 is a field that is the same as the cluster ID 401, and the container ID 504 is a field that is the same as the container ID 403.

The replication count 502 is a field for storing the number of replicas generated using a replication function of the middleware. In the first embodiment, a single cluster includes containers the quantity of which is the same as the value of the replication count 502.

The mode 503 is a field for storing information about required performance of the business system provided using the middleware. One of "performance oriented" or "capacity oriented" is stored in the mode 503 of the first embodiment. Note that "performance oriented" indicates that the business system prioritizes an access performance, and "capacity oriented" indicates that the business system prioritizes efficient use of volume capacity. The information stored in the mode 503 is an example and should not be construed in a limiting sense.

The middleware 505 is a field for storing information indicating the type of middleware operating on the container corresponding to the container ID 504.

The attribute 506 is a field for storing an attribute of middleware in a cluster. For example, information indicating whether the middleware is operating as "Primary" or "Secondary" is stored in the attribute 506.

The cluster management information 211 and the middleware management information 212 may be integrated into a single piece of information.

FIG. 6 is a diagram illustrating an example of a data structure of the volume management information 311 according to the first embodiment.

The volume management information 311 stores an entry including a volume ID 601, a capacity 602, a data control policy 603, a data protection level 604, and a deduplication pattern 605.

The volume ID 601 and the capacity 602 are fields that are respectively the same as the volume ID 405 and the capacity 406.

The data control policy 603 stores information indicating the data control policy of the storage node 120 applied to a storage area allocated to the computer node 110 (middleware). Thus, the field is for setting a data control function of the storage system applied to a volume.

In the data control policy 603 according to the first embodiment, "Dedupe+EC", "No Protection", "Mirroring", and "EC" are stored. Note that "Dedupe+EC" indicates application of a deduplication function and an Erasure Coding function. Note that "No Protection" indicates that the data protection function of the storage system is not applied. Note that "Mirroring" indicates that the Mirroring function is applied. Note that "EC" indicates that the Erasure Coding function is applied.

The data protection level 604 is a field for storing settings of the Erasure Coding function. For the volume to which the erasure coding function is not applied, the data protection level 604 is blank.

The deduplication pattern 605 is a field for storing information indicating an execution timing of deduplication processing. One of "inline" or "post process" is stored in the deduplication pattern 605 according to the first embodiment. Note that "inline" indicates that the deduplication processing is performed in synchronization with volume IO. Note that "post process" indicates that deduplication processing is performed asynchronously with volume IO.

Next, details of processing executed in the computer system will be described. First, the processing executed for generating a volume will be described.

Figure 7:
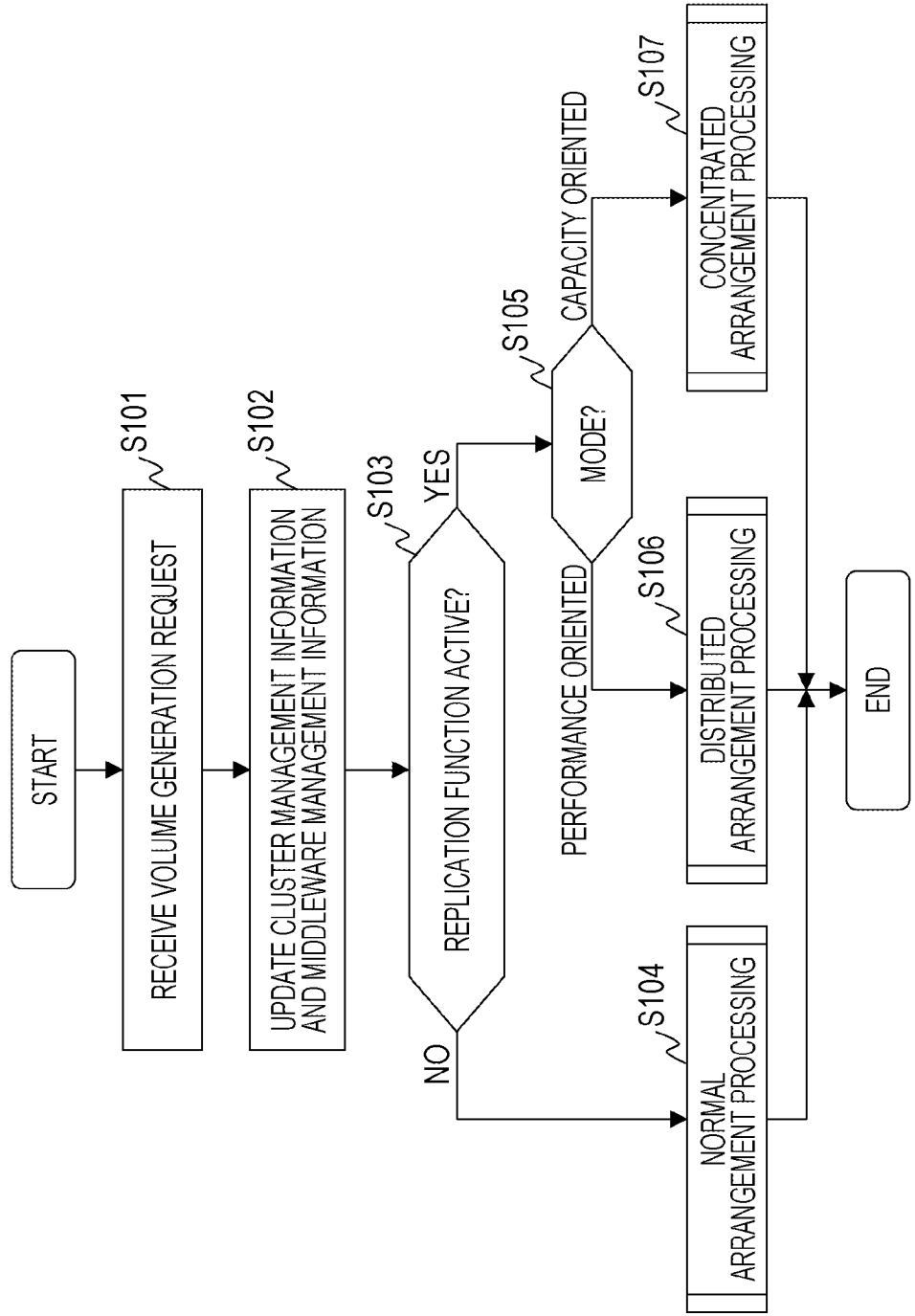
FIG. 7 is a flowchart illustrating an example of volume initial arrangement processing executed by the controller node according to the first embodiment.

FIG. 7 is a flowchart illustrating an example of volume initial arrangement processing executed by the controller node 100 according to the first embodiment.

The computer node 110 transmits a volume generation request to the controller node 100 when a volume is required.

The volume generation request according to the first embodiment includes information about a cluster, information about a capacity of a volume, information about a mode, information about the availability of a business system providing a service, and information about a deduplication pattern.

The information about the cluster includes the identification information about the cluster, the identification information about the computer nodes 110 forming the cluster, the identification information about the container, the type of middleware, the attribute of the middleware, and the like. The information about the mode includes one of "performance oriented" and "capacity oriented". The information about the availability of the business system providing the service includes, as setting information about the data protection function in a middleware layer, a value indicating whether the replication function is active or inactive, the replication count, and the like. The information about the deduplication pattern includes any one of Null, "inline" and "post process". In the following description, information about the mode is referred to as mode information, and information about the availability of the business system providing the service is referred to as availability information.

When the controller node 100 receives the volume generation request from the computer node 110 (step S101), the controller node 100 updates the cluster management information 211 and the middleware management information 212 (step S102). Specifically, the following processing is performed.

The control policy determination program 201 adds an entry to the cluster management information 211, and sets cluster identification information to the cluster ID 501 of the added entry. The control policy determination program 201 generates rows in the added entry, and sets values in the computer node ID 402 and container ID 403 of the generated rows. The number of rows is the same as the number of computer nodes 110 included in the cluster.

The control policy determination program 201 adds an entry to the middleware management information 212, sets cluster identification information to the cluster ID 501 of the added entry, and sets a mode to the mode 503.

When the replication function is active, the control policy determination program 201 sets a replication count to the replication count 502 of the added entry, and generates rows in the container ID 504, the middleware 505, and the attribute 506. The number of the rows corresponds to the replication count. The control policy determination program 201 sets middleware identification information to the middleware 505 of the generated row, and sets the value of the attribute to the attribute 506 of the row.

When the replication function is inactive, the control policy determination program 201 sets "1" to the replication count 502 of the added entry, and generates a single row in the container ID 504, the middleware 505, and the attribute 506. The control policy determination program 201 sets middleware identification information to the middleware 505 of the generated row, and sets the value of the attribute to the attribute 506 of the row.

The control policy determination program 201 generates a reference list of entries including the clusters, the computer nodes 110, the containers, and the middleware, and stores the reference list in the work area. The processing in step S102 is as described above.

Next, the controller node 100 determines whether the replication function is active (step S103).

Specifically, the control policy determination program 201 determines whether the replication count 502 of the entry added to the middleware management information 212 is "1". When the replication count 502 is "1", the control policy determination program 201 determines that the replication function is inactive.

If it is determined that the replication function is inactive, the controller node 100 executes normal arrangement processing (step S104). Then, the controller node 100 ends the volume initial arrangement processing. Details of the normal arrangement processing will be described with reference to FIG. 8.

If it is determined that the replication function is active, the controller node 100 determines the mode (step S105).

If it is determined that the mode is "performance oriented", the controller node 100 executes distributed arrangement processing (step S106). Then, the controller node 100 ends the volume initial arrangement processing. Details of the distributed arrangement processing will be described with reference to FIG. 9.

If it is determined that the mode is "capacity oriented", the controller node 100 executes concentrated arrangement processing (step S107). Then, the controller node 100 ends the volume initial arrangement processing. Details of the concentrated arrangement processing will be described with reference to FIG. 10.

Figure 8:
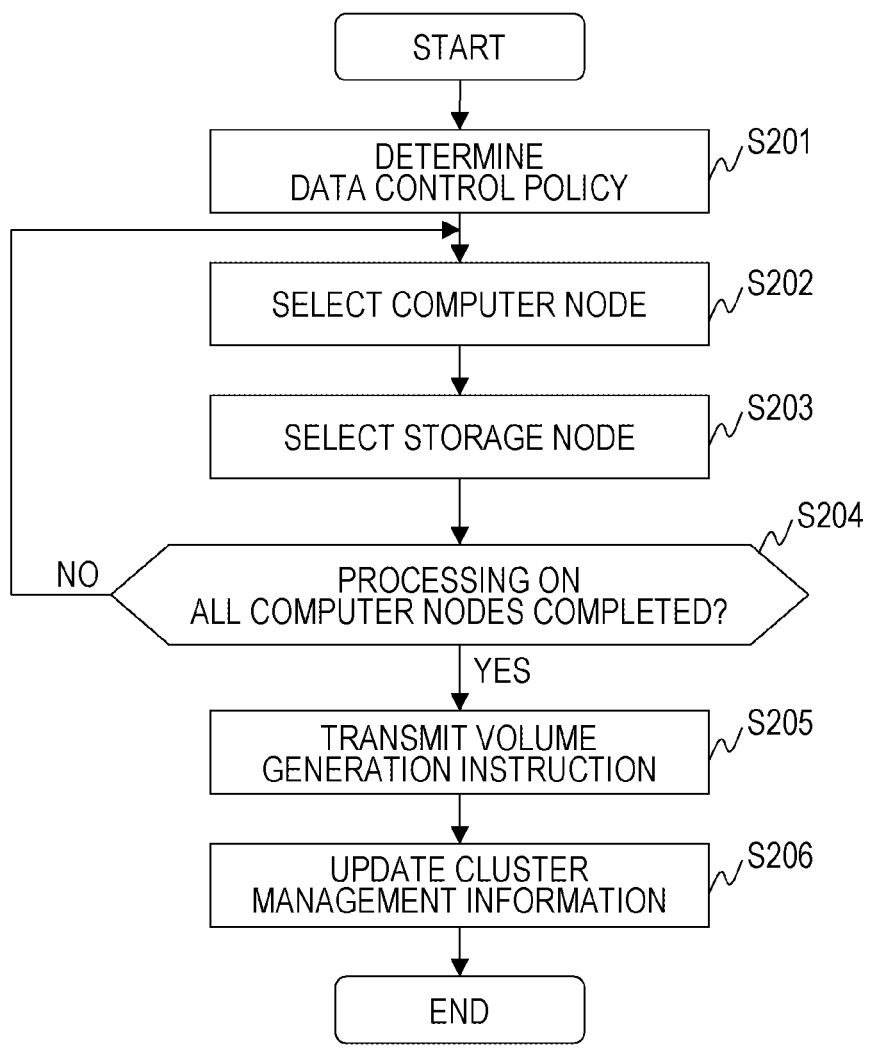
FIG. 8 is a flowchart illustrating an example of normal arrangement processing executed by the controller node according to the first embodiment.

FIG. 8 is a flowchart illustrating an example of the normal arrangement processing executed by the controller node 100 according to the first embodiment.

The controller node 100 determines the data control policy based on the information included in the volume generation request (step S201). Specifically, the following processing is performed.

Since the data protection function of the middleware layer is inactivated, the control policy determination program 201 sets a data control policy that can guarantee the availability of the business system. That is, the control policy determination program 201 determines the data control policy to be "Mirroring" when the mode is "performance oriented". The control policy determination program 201 determines the data control policy to be "EC" and generates setting information about the Erasure Coding function when the mode is "capacity oriented". For example, the setting information includes, for example, the number of data divided and held in a plurality of nodes and the number of parities used for data restoration. For example, the information is described as 4D2P and the like, where D represents the number of data pieces and P represents the number of parities.

The control policy determination program 201 generates data control policy information including "Mirroring" or "EC" and setting information about the erasure coding function.

Information about the data protection function in the storage system layer may be set in the availability information, and the data control policy may be determined based on the information. In this case, the mode may not be taken into consideration. The information about the data protection function in the storage system layer includes a value indicating whether the Erasure Coding function and the Mirroring function are active or inactive, setting information about the Erasure Coding function, and the like. The processing in step S201 is as described above.

Next, the controller node 100 selects the computer node 110 with reference to the reference list (step S202). Furthermore, the controller node 100 selects the storage node 120 to be the arrangement destination of the volume to be allocated to the selected computer node 110 (step S203).

Specifically, the initial arrangement control program 202 selects one entry from the reference list. Furthermore, the initial arrangement control program 202 selects the storage node 120 according to any suitable selection algorithm. In this process, the initial arrangement control program 202 stores temporary data in the memory 102. The temporary information includes the identification information about the cluster and the identification information about the computer node 110 included in the selected entry as well as the identification information about the selected storage node 120.

The storage node 120 to be the arrangement destination of the volume may be selected through any one of the following possible selection methods for example.

(Method 1) The initial arrangement control program 202 selects the storage node 120 to be the arrangement destination of the volume by round robin.

(Method 2) The initial arrangement control program 202 selects the storage node 120 to be the arrangement destination of the volume, based on the capacity usage or IO load of the storage node 120.

(Method 3) The initial arrangement control program 202 selects the storage node 120 to be the arrangement destination of the volume, based on the I/O performance. For example, when the computer node 110 and the storage node 120 are separate computers, the volume arrangement destination featuring a short physical distance or a quick communication response with the computer node 110 which has transmitted the volume generation request, is selected as the storage node 120. In the hyper-converged infrastructure, the volume arrangement destination is selected as the storage node 120 in the same casing as the computer node 110.

Next, the controller node 100 determines whether the processing has been completed for all the computer nodes 110 registered in the reference list (step S204).

If it is determined that the processing has not been completed for all the computer nodes 110 registered in the reference list, the controller node 100 returns to step S202 and executes the same processing.

If it is determined that the processing has been completed for all the computer nodes 110 registered in the reference list, the controller node 100 transmits a volume generation instruction to the determined storage node 120 (step S205).

Specifically, the initial arrangement control program 202 transmits the volume generation instruction to the storage node 120 based on the temporary data. The volume generation instruction includes the capacity of the volume included in the volume generation request, identification information about the selected computer node 110, and data control policy information.

Next, upon receiving a generation completion notification including the identification information about the computer node 110, the identification information about the storage node 120, the volume identification information, the capacity of the volume, and the like from the storage node 120, the controller node 100 updates the cluster management information 211 (step S206). Specifically, the following processing is performed.

In step S102, the initial arrangement control program 202 refers to each row of the entry added to the cluster management information 211, and searches for an entry of which computer node ID 402 matches the identification information about the computer node 110 included in the generation completion notification.

The initial arrangement control program 202 sets values, in the generation completion notification, to the storage node ID 404, volume ID 405, and capacity 406 of the retrieved row. At this time, the IO load 407 remains to be blank. The processing in step S206 is as described above.

Upon receiving the generation completion notification from all of the storage nodes 120 to which the generation instruction has been transmitted, the controller node 100 terminates the normal arrangement processing.

Figure 9:
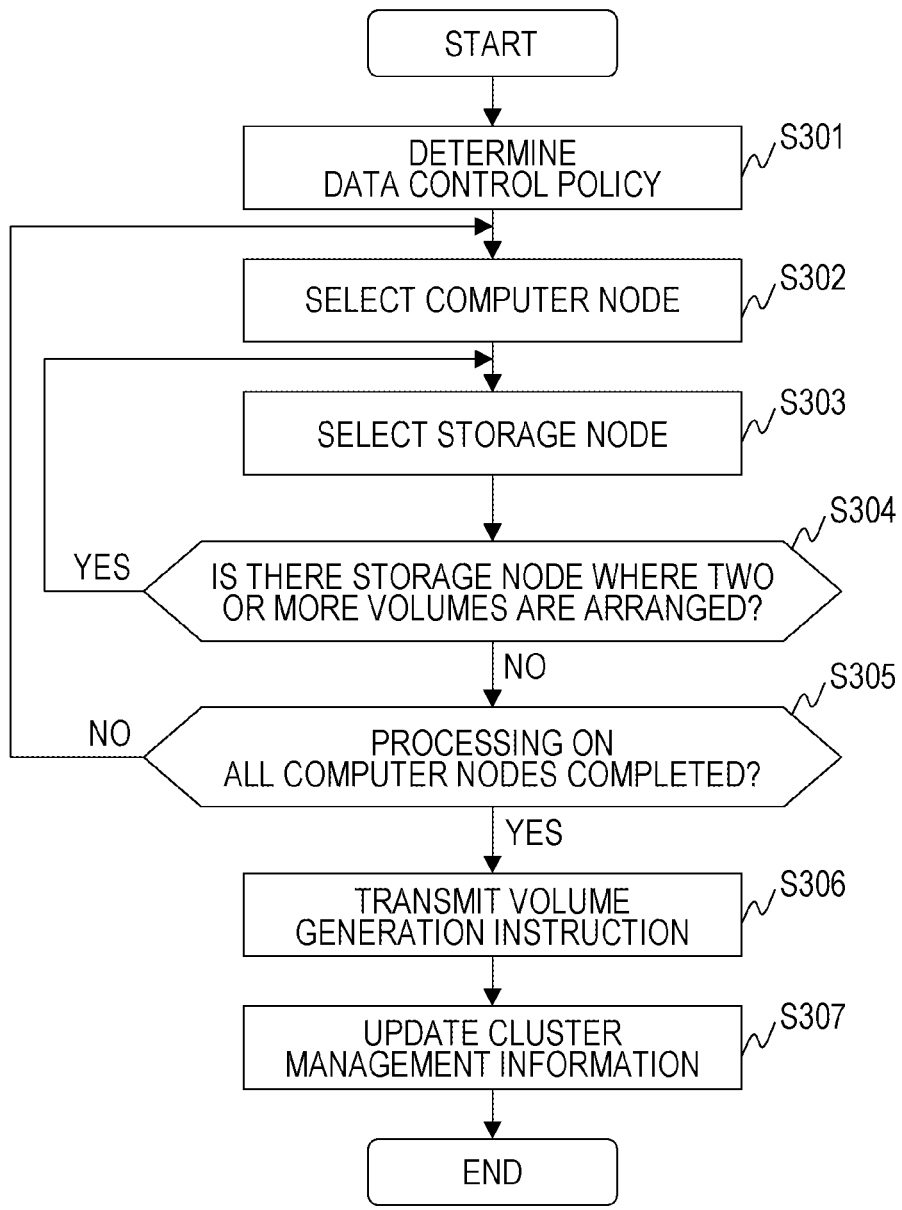
FIG. 9 is a flowchart illustrating an example of distributed arrangement processing executed by the controller node according to the first embodiment.

FIG. 9 is a flowchart illustrating an example of the distributed arrangement processing executed by the controller node 100 according to the first embodiment.

The controller node 100 determines the data control policy based on the information included in the volume generation request (step S301). Specifically, the following processing is performed.

The data protection function of the middleware layer is activated, and the mode is "performance oriented". Thus, to achieve high speed writing and reading of data to and from the volume, the control policy determination program 201 deactivates the data control function of the storage system layer. Specifically, the control policy determination program 201 determines the data control policy to be "No Protection".

The control policy determination program 201 generates data control policy information including "No Protection". The processing in step S301 is as described above.

Next, the controller node 100 selects the computer node 110 with reference to the reference list (step S302). Furthermore, the controller node 100 selects the storage node 120 to be the arrangement destination of the volume to be allocated to the selected computer node 110 (step S303). The processing steps S302 and S303 is the same as that in steps S202 and S203.

Next, the controller node 100 determines whether there is a storage node 120 selected as an arrangement destination of two or more volumes in the same cluster (step S304). Specifically, the following processing is executed.

The initial arrangement control program 202 refers to the cluster management information 211, and searches for an entry with the cluster ID 401 matching the identification information about the cluster included in the entry selected from the reference list. The initial arrangement control program 202 refers to the row included in the retrieved entry and determines whether there is a row in which the identification information about the selected storage node 120 is set to the storage node ID 404.

If there is a row satisfying the above condition, the initial arrangement control program 202 determines that there is a storage node 120 selected as an arrangement destination of two or more volumes in the same cluster.

If there is no row satisfying the above condition, the initial arrangement control program 202 refers to temporary data stored in the memory 102, and determines whether there is temporary data with a combination of identification information about a cluster and the identification information about the storage node 120 matching the identification information about the cluster included in the entry selected from the reference list and the identification information about the selected storage node 120.

If there is temporary data satisfying the above condition, the initial arrangement control program 202 determines that there is a storage node 120 selected as an arrangement destination of two or more volumes in the same cluster.

If there is no temporary data satisfying the above condition, the initial arrangement control program 202 determines that there is no storage node 120 selected as an arrangement destination of two or more volumes in the same cluster.

Step S304 is performed for the following reason. Under the situation where the distributed arrangement processing is executed, the availability of the business system is guaranteed using the data protection function of the middleware layer only. Thus, when a plurality of volumes are generated in the same storage node 120, the business system might stop due to a failure on the storage system side. The controller node 100 performs control so that volumes are arranged in different storage nodes 120 in order to prevent the availability from being compromised as described above. The processing in step S304 is as described above.

If it is determined that there is a storage node 120 selected as an arrangement destination of two or more volumes of the same cluster, the controller node 100 returns to step S303 and executes the same processing.

If it is determined that there is no storage node 120 selected as the arrangement destination of two or more volumes of the same cluster, the controller node 100 determines whether the processing has been completed for all the computer nodes 110 registered in the reference list (step S305).

If it is determined that the processing has not been completed for all the computer nodes 110 registered in the reference list, the controller node 100 returns to step S302 and executes the same processing.

If it is determined that the processing has been completed for all the computer nodes 110 registered in the reference list, a volume generation instruction is sent to the determined storage node 120 (step S306). The processing in step S306 is the same as that in step S205.

Next, upon receiving the generation completion notification from the storage node 120, the controller node 100 updates the cluster management information 211 (step S307). The processing in step S307 is the same as that in step S206.

Upon receiving the generation completion notification from all of the storage nodes 120 to which the generation instruction has been transmitted, the controller node 100 terminates the distributed arrangement processing.

Figure 10:
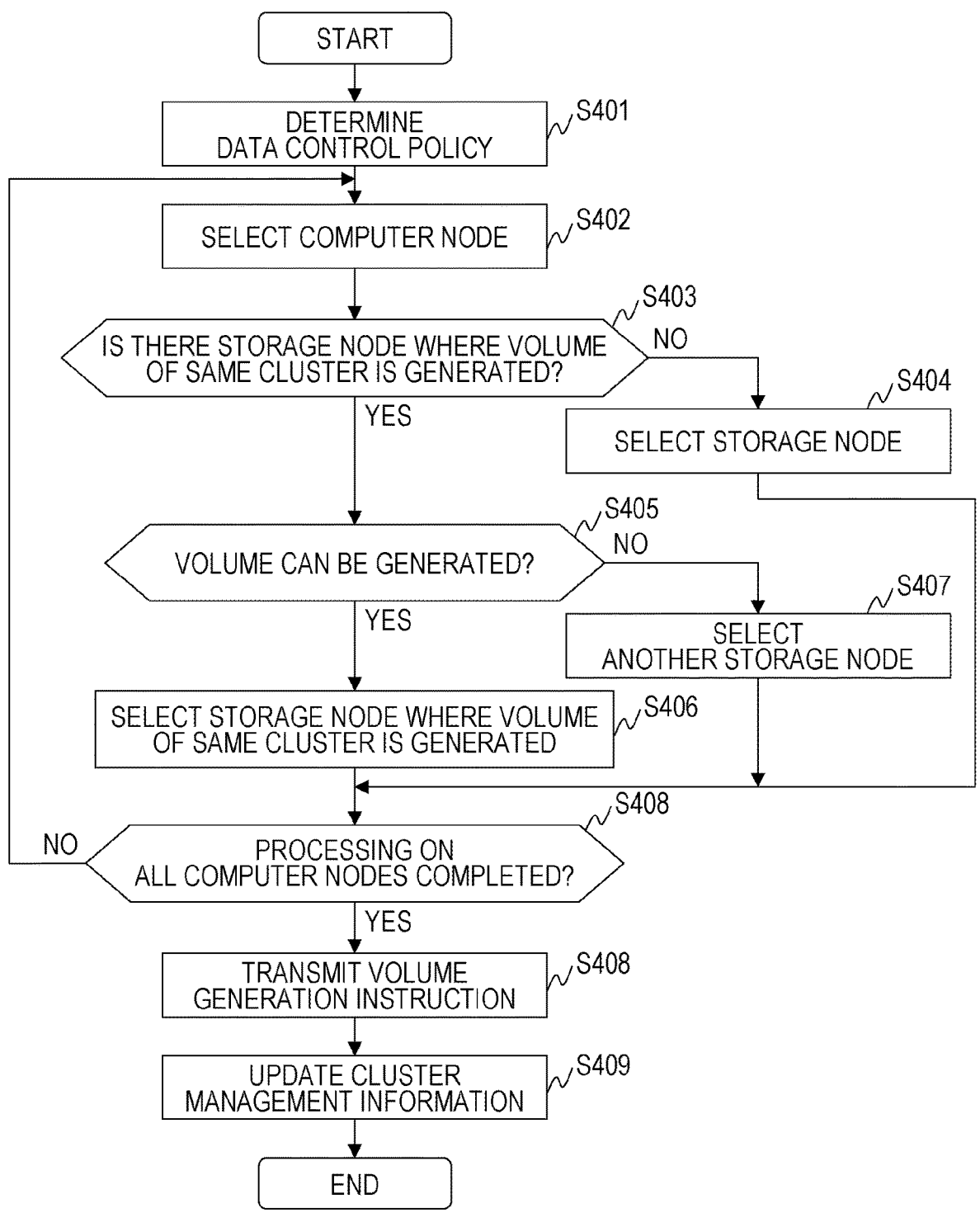
FIG. 10 is a flowchart illustrating an example of concentrated arrangement processing executed by the controller node according to the first embodiment.

FIG. 10 is a flowchart illustrating an example of the concentrated arrangement processing executed by the controller node 100 according to the first embodiment.

The controller node 100 determines the data control policy based on the information included in the volume generation request (step S401). Specifically, the following processing is performed.

The data protection function of the middleware layer is activated, and the mode is "capacity oriented". Thus, the controller node 100 determines to activate the data capacity reduction function. Meanwhile, the availability needs to be prevented from being compromised due to data being erased by the data capacity saving function. Thus, the controller node 100 determines to activate the data protection function. Therefore, the control policy determination program 201 determines the data control policy to be "Dedupe+EC".

The control policy determination program 201 generates data control policy information including setting information about the Erasure Coding function and deduplication setting information. The control policy determination program 201 generates data control policy information including data control policy, setting information about the erasure coding function, and deduplication setting information.

Information about the data protection function in the storage system layer and about the data capacity saving function may be set in the availability information. In such a case, the control policy determination program 201 generates setting information about the erasure coding function and deduplication setting information, based on the availability information. The processing in step S401 is as described above.

Next, the controller node 100 selects the computer node 110 with reference to the reference list (step S402).

Next, the controller node 100 determines whether there is a storage node 120 in which a volume of the computer node 110 belonging to the cluster including the selected computer node 110 is generated (step S403). Specifically, the following processing is performed.

The initial arrangement control program 202 refers to the cluster management information 211 and determines whether there is an entry with the cluster ID 401 matching the identification information about the target cluster. The initial arrangement control program 202 refers to the row included in the retrieved entry and determines whether there is a row in which the identification information about the selected storage node 120 is set to the storage node ID 404.

If there is an entry satisfying the above condition, the initial arrangement control program 202 determines that there is a storage node 120 in which a volume of the computer node 110 belonging to the cluster including the selected computer node 110 is generated.

If there is no entry satisfying the above condition, the initial arrangement control program 202 determines whether or not there is temporary data in the memory 102 in which the identification information about the target cluster is set.

If there is temporary data satisfying the above condition, the initial arrangement control program 202 determines that there is a storage node 120 in which a volume of the computer node 110 belonging to the cluster including the selected computer node 110 is generated.

If there is no temporary data satisfying the above condition, the initial arrangement control program 202 determines that there is no storage node 120 in which a volume of the computer node 110 belonging to the cluster including the selected computer node 110 is generated. The processing in step S403 is as described above.

If it is determined that there is no storage node 120 that satisfies the condition, the controller node 100 selects the storage node 120 to be the arrangement destination of the volume to be allocated to the selected computer node 110 (step S404), and then proceeds to step S408. The processing in step S404 is the same as that in step S203.

If it is determined that there is a storage node 120 that satisfies the condition, the controller node 100 determines whether or not a volume can be generated in the storage node 120 (step S405).

Specifically, the initial arrangement control program 202 determines whether or not a volume can be generated in the storage node 120 based on the free capacity and performance of the storage node 120 and the load between the storage nodes 120.

If it is determined that the volume can be generated in the storage node 120 that satisfies the condition, the controller node 100 selects the storage node 120 (step S406), and then proceeds to step S408. In this process, the controller node 100 stores temporary data, in the memory 102, including the identification information about the cluster and the identification information about the computer node 110 included in the selected entry as well as the identification information about the selected storage node 120.

If it is determined that the volume cannot be generated in the storage node 120 that satisfies the condition, the controller node 100 selects, from the storage nodes 120 other than the storage node 120, the storage node 120 to be the arrangement destination of the volume to be allocated to the selected computer node 110 (step S407), and then proceeds to step S408. In this process, the controller node 100 stores temporary data, in the memory 102, including the identification information about the cluster and the identification information about the computer node 110 included in the selected entry as well as the identification information about the selected storage node 120.

In step S407, a method other than (Method 1), (Method 2), and (Method 3) may be employed. Specifically, the storage node 120 may be selected based on the attribute of the volume. For example, when the attribute of the volume allocated by the target computer node 110 is "Secondary", the initial arrangement control program 202 selects the storage node 120 featuring a short physical distance from or fast communication response with the storage node 120 in which the volume of which attribute is "Primary" is generated.

After the processing in step S404, step S406, or step S407 has been executed, the controller node 100 determines whether the processing has been completed for all the computer nodes 110 registered in the reference list (step S408).

If it is determined that the processing has not been completed for all the computer nodes 110 registered in the reference list, the controller node 100 returns to step S402 and executes the same processing.

If it is determined that the processing has been completed for all the computer nodes 110 registered in the reference list, a volume generation instruction is sent to the determined storage node 120 (step S409). The processing in step S409 is the same as that in step S205. The number of data pieces and parities included in the setting information may be input by the user. Furthermore, the number of parities enabling the availability to be maintained may be automatically determined from the replication count of middleware.

Next, upon receiving the generation completion notification from the storage node 120, the controller node 100 updates the cluster management information 211 (step S410). The processing in step S410 is the same as that in step S206.

Upon receiving the generation completion notification from all of the storage nodes 120 to which the generation instruction has been transmitted, the controller node 100 terminates the distributed arrangement processing.

Figure 11:
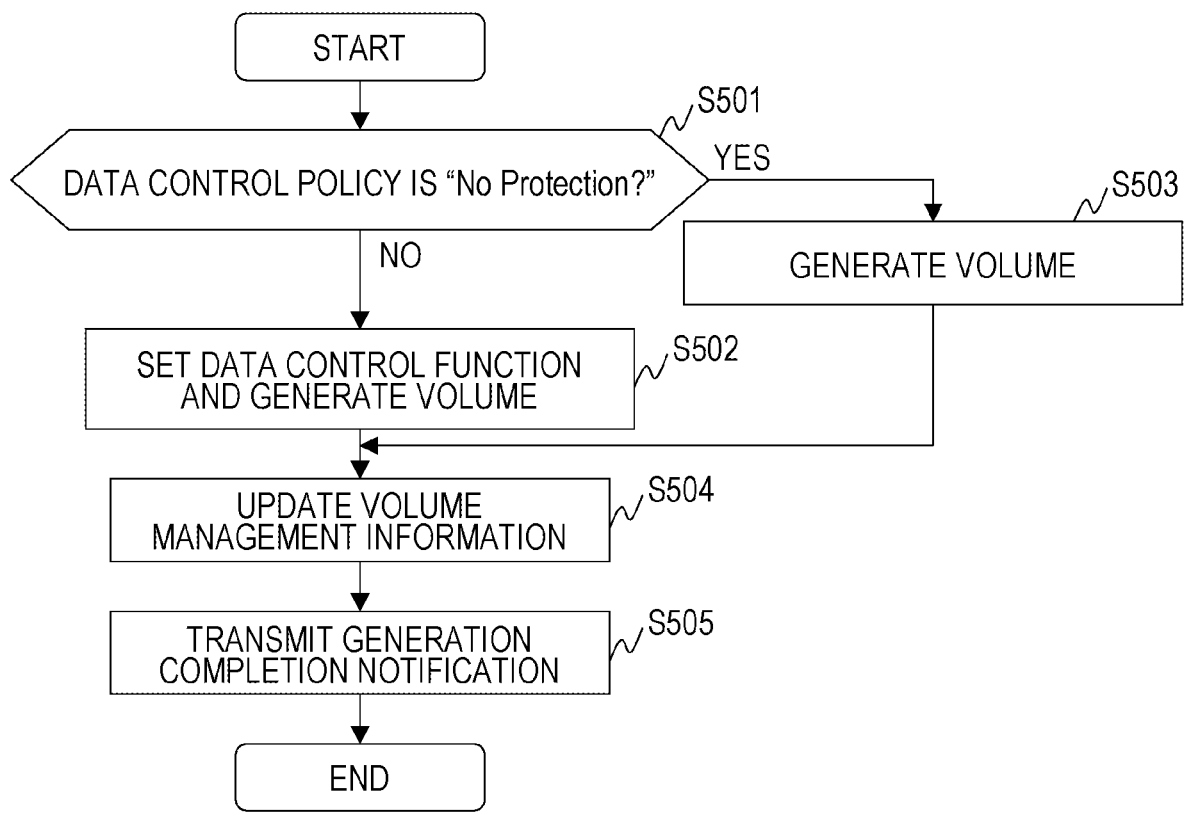
FIG. 11 is a flowchart illustrating an example of volume generation processing executed by the storage node according to the first embodiment.

FIG. 11 is a flowchart illustrating an example of volume generation processing executed by the storage node 120 according to the first embodiment.

When the storage node 120 receives a volume generation instruction, the storage node 120 starts the processing described below.

The storage node 120 refers to the data control policy information included in the volume generation instruction, and determines whether the data control policy is "No Protection" (step S501).

If it is determined that the data control policy is not "No Protection", the storage node 120 sets the data control function according to the data control policy, and generates a volume (step S502). Then, the storage node 120 proceeds to step S504.

For example, the volume generation program 301 sets information required to execute the deduplication/compression program 304 or the Erasure Coding program 305.

If it is determined that the data control policy is "No Protection", the storage node 120 generates a volume (step S503). Then, the storage node 120 proceeds to step S504.

After the processing in step S502 or step S503 has been executed, the storage node 120 updates the volume management information 311 (step S504).

Specifically, the volume generation program 301 generates an entry in the volume management information 311, and sets the identification information about the generated volume to the volume ID 601 of the generated entry. The volume generation program 301 sets the capacity included in the volume generation instruction to the capacity 602 of the added entry. Furthermore, the volume generation program 301 sets values in the data control policy 603, the data protection level 604, and the deduplication pattern 605 of the generated entry based on the data control policy information included in the volume generation instruction.

Next, the storage node 120 transmits a generation completion notification to the controller node 100 (step S505). Then, the storage node 120 ends the volume generation processing.

Next, processing executed by the storage node 120 upon receiving a Write request from the computer node 110 will be described.

Figure 12A:
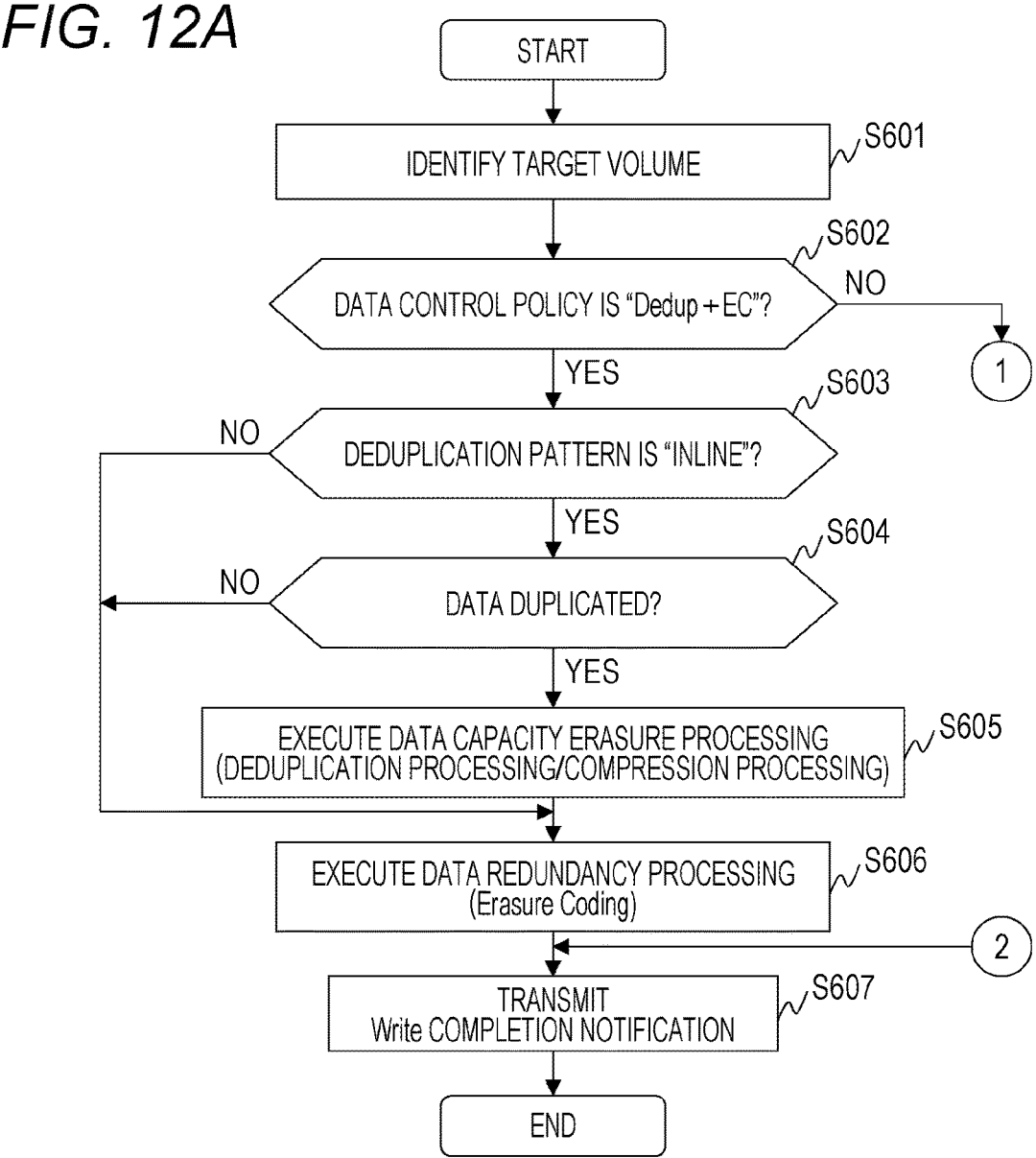
FIG. 12A is a flowchart illustrating an example of Write processing executed by the storage node according to the first embodiment.
Figure 12B:
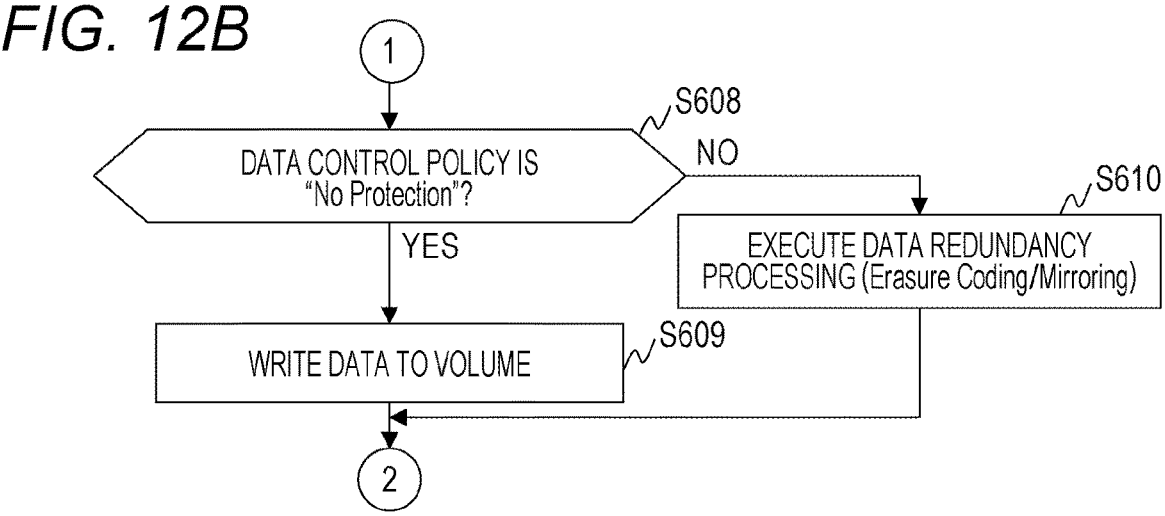
FIG. 12B is a flowchart illustrating an example of Write processing executed by the storage node according to the first embodiment.

FIGS. 12A and 12B are flowcharts illustrating an example of Write processing executed by the storage node 120 according to the first embodiment.

When the storage node 120 receives a write request from the computer node 110, the storage node 120 starts the write processing. The write request includes the address of the computer node 110, the identification information about the computer node 110, the identification information about the container, the identification information about the middleware, the identification information about the volume, the data to be written, and the like.

The storage node 120 identifies a target volume based on the Write request (step S601).

Specifically, the I/O processing program 303 acquires volume identification information from the Write request.

Next, the storage node 120 determines whether the data control policy is "Dedupe+EC" (step S602).

Specifically, the I/O processing program 303 refers to the volume management information 311, and searches for an entry in which the identification information about the target volume is set to the volume ID 601. The I/O processing program 303 determines whether "Dedupe+EC" is set to the data control policy 603 of the retrieved entry.

If it is determined that the data control policy of the target volume is "Dedupe+EC", the storage node 120 determines whether the deduplication pattern of the target volume is "inline" (step S603).

Specifically, the I/O processing program 303 determines whether the deduplication pattern 605 of the entry found by the search in step S602 is "inline".

If it is determined that the deduplication pattern of the target volume is not "inline", the storage node 120 proceeds to step S606.

If it is determined that the deduplication pattern of the target volume is "inline", the storage node 120 determines whether there is any duplicated data in the volume (step S604).

Specifically, the I/O processing program 303 determines whether duplicated data exists in the volume by comparing hash values of the data stored in the volume. The present invention is not limited to the method of determining the duplicated data.

If it is determined that there is no duplicated data in the volume, the storage node 120 proceeds to step S606.

If it is determined there is the duplicated data in the volume, the storage node 120 executes data capacity saving processing (step S605). Thereafter, the storage node 120 proceeds to step S606.

Specifically, the I/O processing program 303 outputs an execution instruction to the deduplication/compression program 304. Upon receiving the execution instruction, the deduplication/compression program 304 executes at least one of deduplication processing and compression processing. The deduplication processing and the compression processing are known techniques, and thus will not be described in detail.

When a result of the determination in step S603 or S604 is No or after the processing in step S605 has been executed, the storage node 120 executes data redundancy processing (step S606). Then, the storage node 120 proceeds to step S607.

Specifically, the I/O processing program 303 outputs an execution instruction, including the value set to the data protection level 604, to the Erasure Coding program 305.

The Erasure Coding program 305 executes the data redundancy processing using Erasure Coding, based on the value input from the I/O processing program 303. The data redundancy processing using erasure coding is a known technique, and thus will not be described in detail.

When it is determined in step S602 that the data control policy is not "Dedupe+EC", the storage node 120 determines whether the data control policy is "No Protection" (step S608).

Specifically, the I/O processing program 303 determines whether "No Protection" is set to the data control policy 603 of the entry found by the search in step S602.

If it is determined that the data control policy is "No Protection", the I/O processing program 303 writes data in the target volume (step S609). Then, the storage node 120 proceeds to step S607.

If it is determined that the data control policy is not "No Protection", the I/O processing program 303 executes data redundancy processing (step S610). Then, the storage node 120 proceeds to step S607.

Specifically, when the data control policy is "EC", the I/O processing program 303 outputs an execution instruction to the Erasure Coding program 305, and when the data control policy is "Mirroring", the I/O processing program 303 outputs the execution instruction to the Mirroring program 306. The erasure Coding program 305 executes data redundancy processing using Erasure Coding, and the mirroring program 306 executes data redundancy processing using Mirroring.

In step S607, the storage node 120 transmits a Write completion notification to the computer node 110 that has transmitted the Write request (step S607), and then ends the Write processing.

If the deduplication pattern of the target volume is "post process", the storage node 120 executes deduplication processing/compression processing as background processing, after the Erasure Coding processing has been executed (step S606).

As described above, the controller node 100 determines the data control policy of the storage node 120 to be applied to the volume allocated to the middleware, based on the mode information and the availability information, when the volume is generated, and notifies the storage node 120 of the policy. The storage node 120 executes processing suitable for each volume by managing the volumes and data control policies in association with each other. This configuration can achieve a system effectively utilizing the storage capacity, without compromising the availability of the business system. In particular, the configuration features "No Protection" and "Dedupe+EC" employed as data control policies.

A service performance oriented business system in which the data protection function of the middleware is active is required to achieve both data capacity saving and excellent service performance. In this case, the controller node 100 determines that the data control policy is "No Protection", so that the storage node 120 is controlled so as not to perform data redundancy and the like. Such control can achieve the business system capable of providing high-performance service while maintaining availability and saving data capacity.

However, when the volume to which data is written by the replication function is arranged in the same storage node 120, the service stops due to a failure of the storage node 120 or the like. Thus the controller node 100 performs control so that a group of volumes of which data control policy is "No Protection" are arranged in different storage nodes 120.

A capacity oriented business system in which the data protection function of the middleware is active is required to achieve data capacity saving while maintaining the availability. In such a case, the controller node 100 determines the data control policy to be "Dedupe+EC" in order to perform control to reduce redundant data and to prevent the availability from being compromised. With the data amount the volume written to a plurality of storage nodes 120 using the Erasure Coding function, the service can be prevented from being stopped for a long period of time even when the duplicated data is erased. Such control can achieve the business system capable of saving data capacity while maintaining availability.

However, to quickly find and erase duplicated data, the controller node 100 performs control so that a group of volumes of which data control policy is "Dedupe+EC" are arranged in the same storage node 120.

Next, processing executed when operating a business system using a volume will be described.

Figure 13B:
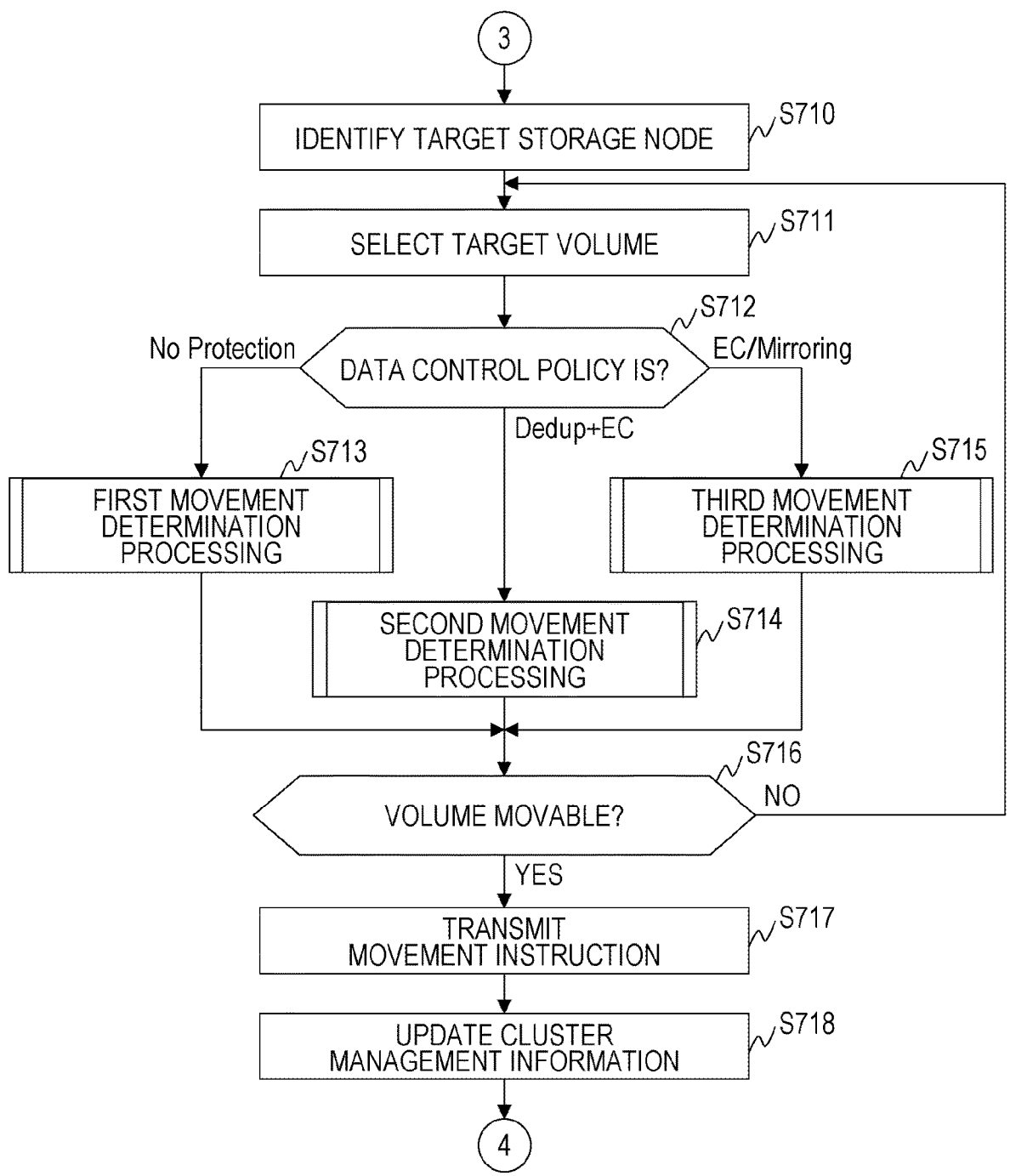
FIG. 13B is a flowchart illustrating an example of volume movement determination processing executed by the controller node according to the first embodiment.

FIGS. 13A and 13B are flowcharts for explaining an example of volume movement determination processing executed by the controller node 100 according to the first embodiment.

The volume movement control program 203 of the controller node 100 starts the volume movement determination processing after the controller node 100 has been activated.

The controller node 100 monitors the state of the storage node 120 (step S701). The monitoring may be performed at periodic timings or at a timing when an I/O request is issued.

The controller node 100 determines whether there is a cluster that satisfies the deduplication condition based on a result of the monitoring (step S702).

Specifically, the volume movement control program 203 determines that there is a cluster that satisfies the deduplication condition, when there is a cluster with the IO loads 407 all set to be "Cold", or when a write request for data with a larger size is issued. This deduplication condition is an example and should not be construed in a limiting sense.

If it is determined that there is a cluster that satisfies the deduplication condition, the controller node 100 identifies a target volume group (step S703).

Specifically, the volume movement control program 203 refers to the cluster management information 211, and searches for an entry with the identification information about the cluster satisfying the deduplication condition set to the cluster ID 401. The volume movement control program 203 acquires the volume ID 405 of each row included in the retrieved entry, generates a volume list including volume identification information, and stores the volume list in the work area.

Next, the controller node 100 determines the storage node 120 to be the movement destination of the target volume group (step S704).

Specifically, the volume movement control program 203 determines, based on the free capacity and load of the storage node 120, the storage node 120 to be the arrangement destination of the volume such that the storage node 120, in such a manner that the smaller number of such storage nodes are determined.

For example, in a case of middleware having attributes of "Primary" and "Secondary", the volume movement control program 203 may select, as the volume movement destination, the storage node 120 featuring a short physical distance or fast communication response with the computer node 110 on which the middleware with the attribute "Primary" operates. The determination method mentioned above is an example, and should not be construed in a limiting sense.

The volume movement control program 203 may determine the storage node 120 to be the movement destination by a volume by volume basis, an LU by LU basis, or by a page group by page group basis.

Next, the controller node 100 selects one target volume from the target volume group (step S705), and transmits a movement instruction to the storage node 120 that is the source of the target volume. The movement instruction includes the identification information about the computer node 110, the identification information about the volume, and the identification information about the storage node 120 to be the movement destination (step S706).

The volume movement program 302 of the storage node 120 that is the source of the target volume executes volume movement processing based on the movement instruction. The volume movement processing includes copying data, deleting the volume from the source, updating the volume management information 311, and the like. Note that the volume movement processing is a known technique, and will not be described in detail. The volume management information 311 is updated in the storage node 120 that is the source and the storage node 120 that is the movement destination.

The volume movement program 302 of the storage node 120 that is the source transmits a movement completion notification to controller node 100 after the volume movement processing has been completed. The notification includes the identification information about the storage node 120, the identification information about the computer node 110, and the identification information about the volume.

Next, the controller node 100 determines whether movement of all the volumes registered in the volume list has been completed (step S707).

If it is determined that the movement of all the volumes registered in the volume list has not been completed, the controller node 100 returns to step S705 and executes the same processing.

If it is determined that the migration of all the volumes registered in the volume list is completed, the controller node 100 updates the cluster management information 211 (step S708). Then, the controller node 100 returns to step S701 and executes the same processing.

Specifically, in step S702, the volume movement control program 203 sets a value, included in the movement completion notification, to the storage node ID 404 and the volume ID 405 of each row included in the entry retrieved in step S702.

If it is determined in step S702 that there is no cluster satisfying the deduplication condition, the controller node 100 determines whether there is a storage node 120 satisfying the load condition (step S709).

Specifically, the volume movement control program 203 determines whether there is a storage node 120 of which storage area usage or I/O load exceeds a threshold. The load condition is an example and should not be construed in a limiting sense.

If it is determined that there is no storage node 120 that satisfies the load condition, the controller node 100 returns to step S701 and executes the same processing.

If it is determined that there is a storage node 120 that satisfies the load condition, the controller node 100 identifies the target storage node 120 (step S710).

Specifically, the volume movement control program 203 identifies the storage node 120 that satisfies the load condition as the target storage node 120. In this process, the volume movement control program 203 generates a storage node list including identification information about the storage nodes 120 other than the target storage node 120, and stores the storage node list in the work area.

When there are a plurality of storage nodes 120 that satisfy the load condition, the volume movement control program 203 identifies the storage node 120 with the highest load as the target storage node 120. The volume movement control program 203 may identify a predetermined number of storage nodes 120 as the target storage nodes 120 in descending order of load.

Next, the controller node 100 selects a target volume from the volumes arranged in the target storage node 120 (step S711), and determines a data control policy associated with the target volume (step S712).

Specifically, the volume movement control program 203 refers to the cluster management information 211, and searches for a row in which the identification information about the target storage node 120 is set to the storage node ID 404. The volume movement control program 203 refers to the capacity 406 of the retrieved rows, and selects the row of which capacity 406 has the largest value. The volume movement control program 203 selects a volume corresponding to the volume ID 405 of the selected row as the target volume.

If there are a plurality of rows with the largest value of the capacity 406, the volume movement control program 203 may select a volume by round robin, or based on the load of the storage node 120.

If the data control policy associated with the target volume is "No Protection", the controller node 100 executes first movement determination processing (step S713). After completing the first movement determination processing, the controller node 100 proceeds to step S716. Details of the first movement determination processing will be described with reference to FIG. 14.

If the data control policy associated with the target volume is "Dedupe+EC", the controller node 100 executes second movement determination processing (step S714). After completing the second movement determination processing, the controller node 100 proceeds to step S716. Details of the second movement determination processing will be described with reference to FIG. 15.

If the data control policy associated with the target volume is any one of "EC" and "Mirroring", the controller node 100 executes third movement determination processing (step S715). After completing the third movement determination processing, the controller node 100 proceeds to step S716. Details of the third movement determination processing will be described with reference to FIG. 16.

In step S716, the controller node 100 determines whether the target volume can be moved (step S716).

Specifically, the volume movement control program 203 determines whether the target volume is movable based on the processing result of each movement determination processing. When the processing result indicating "movable" is output as a result of executing the movement determination processing, the volume movement control program 203 determines that the target volume can be moved.

If it is determined that the target volume is unmovable, the controller node 100 returns to step S711 and executes the same processing.

If it is determined that the target volume is movable, the controller node 100 transmits a movement instruction to the storage nodes 120 that are the source and the movement destination of the target volume (step S717). The movement instruction includes the identification information about the computer node 110 and the identification information about the volume. The processing in step S717 is the same as that in step S706.

Next, the controller node 100 updates the cluster management information 211 (step S718). Then, the controller node 100 returns to step S701 and executes the same processing. The processing in step S718 is the same as that in step S708.

Figure 14:
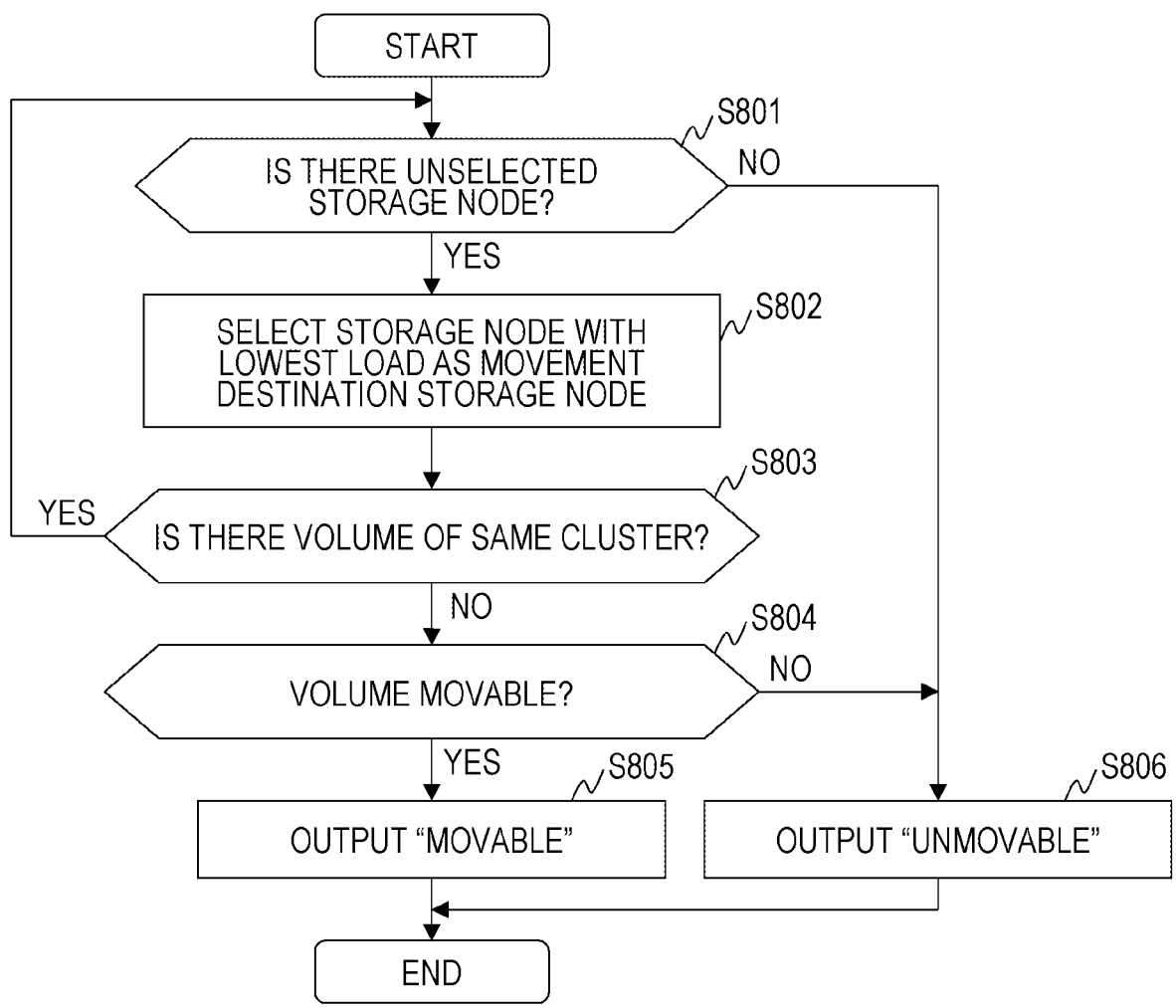
FIG. 14 is a flowchart illustrating an example of first movement determination processing executed by the controller node according to the first embodiment.

FIG. 14 is a flowchart illustrating an example of the first movement determination processing executed by the controller node 100 according to the first embodiment.

The controller node 100 refers to the storage node list and determines whether there is a storage node 120 that has not been selected yet (step S801).

If it is determined that there is no storage node 120 that has not been selected yet, the controller node 100 proceeds to step S806.

If it is determined that there is a storage node 120 that has not been selected yet, the controller node 100 selects the storage node 120 with the lowest load as a candidate storage node 120 (step S802).

Specifically, the volume movement control program 203 refers to the list of storage nodes 120 and identifies the storage node 120 that has not been selected yet. The volume movement control program 203 selects the storage node 120 with the lowest load based on a result of monitoring the storage node 120 identified.

Next, the controller node 100 determines whether the candidate storage node 120 includes a volume of the computer node 110 belonging to the cluster including the computer node 110 to which the target volume is allocated (step S803). Specifically, the following processing is performed.

The volume movement control program 203 refers to the cluster management information 211 and searches for a row in which the identification information about the target storage node 120 and the identification information about the target volume are respectively set to the storage node ID 404 and the volume ID 405.

The volume movement control program 203 refers to the storage node ID 404 of the entry including the retrieved row, and determines whether there is a row in which the identification information about the candidate storage node 120 is set. If there is a row satisfying the above condition, the volume movement control program 203 determines that the candidate storage node 120 includes the volume of the computer node 110 belonging to the cluster including the computer node 110 to which the target volume is allocated.

Step S803 is executed for a reason that is the same as that for executing step S304. The processing in step S803 is as described above.

If it is determined that there is a volume satisfying the condition of step S803, the controller node 100 erases the storage node 120 selected from the list of storage nodes 120, and then returns to step S801 to execute the same processing.

If it is determined that there is no volume satisfying the condition of step S803, the controller node 100 determines whether the target volume of the candidate storage node 120 can be moved (step S804).

Specifically, the volume movement control program 203 determines that the target volume of the candidate storage node 120 can be moved if the free capacity or I/O load after moving the target volume to the candidate storage node 120 is smaller than a threshold. The determination method mentioned above is an example, and should not be construed in a limiting sense.

If it is determined that the target volume of the candidate storage node 120 can be moved, the controller node 100 outputs a processing result (step S805) and ends the first movement determination processing. This result includes the identification information about the target storage node 120, the identification information about the target volume, the identification information about the candidate storage node 120, and "moveable".

If a result of the determination in step S801 or step S804 is No, the controller node 100 outputs a processing result including "unmovable" (step S806), and ends the first movement determination processing.

Figure 15:
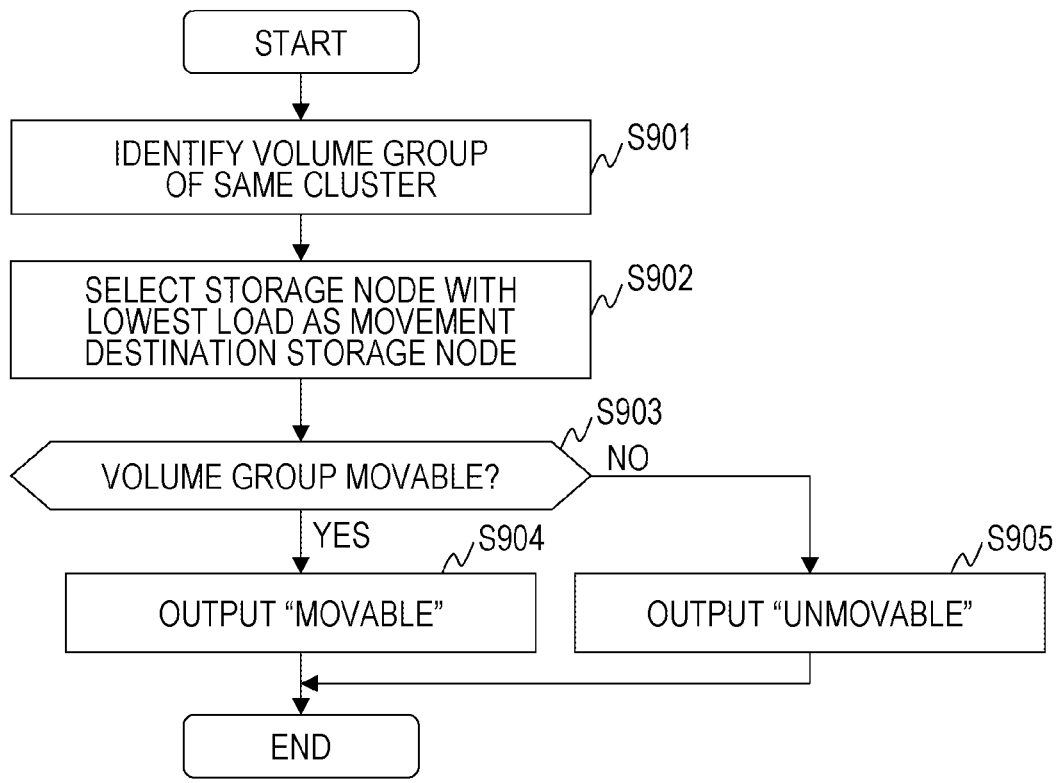
FIG. 15 is a flowchart illustrating an example of second movement determination processing executed by the controller node according to the first embodiment.

FIG. 15 is a flowchart illustrating an example of the second movement determination processing executed by the controller node 100 according to the first embodiment.

The controller node 100 identifies a volume group of the computer node 110 in the cluster including the computer node 110 to which the target volume is allocated (step S901).

Specifically, the volume movement control program 203 refers to the cluster management information 211 and searches for a row in which the identification information about the target storage node 120 and the identification information about the target volume are respectively set to the storage node ID 404 and the volume ID 405. The volume movement control program 203 acquires a set of storage node ID 404 and volume ID 405 of the entry including the retrieved row.

In the second movement determination processing, volumes are moved in a volume group by volume group basis. This is because the capacity can be efficiently reduced with volumes concentrated in the same storage node 120 as much as possible.

Next, the controller node 100 selects the storage node 120 with the lowest load as the candidate storage node 120 (step S902). The processing in step S902 is the same as that in step S802.

Next, the controller node 100 determines whether the volume group can be moved (step S903).

Specifically, the volume movement control program 203 determines whether the free capacity or I/O load after moving the volume group to the candidate storage node 120 is smaller than a threshold. If the free capacity or I/O load after moving the volume group to the candidate storage node 120 is smaller than the threshold, the volume movement control program 203 determines that the volume group can be moved. The determination method mentioned above is an example, and should not be construed in a limiting sense.

If it is determined that the volume group can be moved, the controller node 100 outputs a processing result (step S904) and ends the second movement determination processing. This result includes the identification information about the target storage node 120, the identification information about the target volume, the identification information about the candidate storage node 120, and "moveable".

If it is determined that the volume group is unmovable, the controller node 100 outputs a processing result including "unmovable" (step S905), and ends the second movement determination processing.

Figure 16:
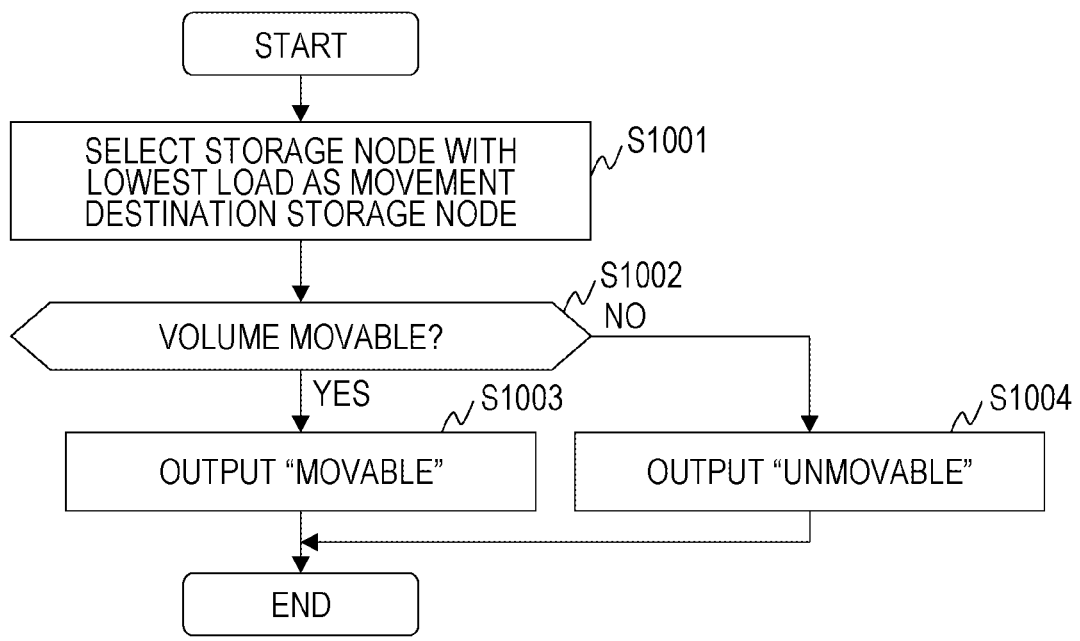
FIG. 16 is a flowchart illustrating an example of third movement determination processing executed by the controller node according to the first embodiment.

FIG. 16 is a flowchart illustrating an example of the third movement determination processing executed by the controller node 100 according to the first embodiment.

The controller node 100 selects the storage node 120 with the lowest load as the candidate storage node 120 (step S1001). The processing in step S1001 is the same as that in step S802.

Next, the controller node 100 determines whether the target volume of the candidate storage node 120 can be moved (step S1002). The processing in step S1002 is the same as that in step S804.

If it is determined that the target volume of the candidate storage node 120 can be moved, the controller node 100 outputs a processing result (step S1003) and ends the third movement determination processing. This result includes the identification information about the target storage node 120, the identification information about the target volume, the identification information about the candidate storage node 120, and "moveable".

If it is determined that the target volume of the candidate storage node 120 is unmovable, the controller node 100 outputs a processing result including "unmovable" (step S1004), and ends the third movement determination processing.

As described above, the controller node 100 determines the storage node 120 on which a volume is to be arranged, based on the data control policy associated with the volume. This configuration can achieve a system effectively utilizing the storage capacity, without compromising the availability of the business system.

The present invention is not limited to the embodiments described above, but includes various modifications. Furthermore, for example, the above-described embodiment is described in detail in order to explain the present invention in an easily understandable manner, and the present invention is not necessarily limited to a system having all the described configurations. Further, part of the configuration of each embodiment can be added to, deleted from, or replaced with another configuration.

Further, the configurations, functions, processing units, processing means, and the like described above may each be implemented by hardware, for example, by partially or entirely being designed with an integrated circuit. The present invention can also be implemented by a program code of software that implements the functions according to the embodiment. In this case, a storage medium storing the program code is provided to the computer, and a processor of the computer reads the program code stored in the storage medium. In this case, the program code itself read from the storage medium implements the function of the embodiment, and the program code itself and the storage medium storing the same constitute the present invention. As a storage medium for supplying such a program code, for example, a flexible disk, a compact disc-read only memory (CD-ROM), a digital versatile disc-read only memory (DVD-ROM), a hard disk, a solid state drive (SSD), an optical disk, a magneto-optical disk, a compact disc-recordable (CD-R), a magnetic tape, a non-volatile memory card, read only memory (ROM), or the like is used.

Furthermore, the program code for implementing the functions according to the embodiment can be implemented by a wide range of programs or script languages such as assembler, C/C++, perl, shell, PHP, Python, Java (registered trademark), and the like for example.

Furthermore, the program code of the software for implementing the functions according to the embodiment may be distributed through a network. Thus, the program code stored in a storage means such as a hard disk or a memory of a computer or a storage medium such as a compact disc-rewritable (CD-RW) or CD-R may be read by a processor of a computer to implement the functions.

In the above-described embodiment, control lines and information lines indicate what is considered necessary for the description, and not all the control lines and the information lines in the product are necessarily illustrated. All configurations may be connected to each other.

What is claimed is:

1. A computer system comprising:
   at least one storage device that provides a storage area to one of a plurality of data management nodes having a data protection function for achieving availability of a system providing a service and having a data control function for the storage area;
   at least one input/output device; and
   at least one processor communicatively coupled to the at least one storage device and the at least one input/output device, wherein the at least one processor is configured to:
   manages arrangement of the storage area and a data control policy applied to the storage area,
   identify a target volume,
      acquires first setting information about the availability of the system providing the service and performance of the service and determines the data control policy applied to the storage area, based on the first setting information,
   determine if the data control policy is a first scheme,
      determine if a deduplication pattern of the target volume is synchronized with a volume IO, when the data control policy is the first scheme,
      determine if the target volume includes duplicate data, when the deduplication pattern of the target volume is synchronized,
      execute a data capacity saving process, when the target volume includes duplicate data, and
      execute data redundancy processing in the target volume, and
   when the data control policy is not the first scheme,
      determine if the data control policy is a second scheme,
      write data in the target volume when the data control policy is the second scheme, and
      when the data control policy is not the second scheme, execute an other data redundancy processing in the target volume and write data in the target volume.

2. The computer system according to claim 1, wherein the at least storage device holds storage area management information for managing the storage area,
   the processor
      determines from the at least one storage device, upon receiving a generation request for a first storage area from a first data management node of the plurality of data management nodes, a storage area management node that manages the storage device in which the first storage area is arranged, the generation request including the first setting information,
      determines the data control policy applied to the first storage area, based on the first setting information, and
      transmits the generation request for the first storage area to the determined storage area management node, the generation request including the data control policy,
   the determined storage area management node
      sets the data control function, based on the data control policy, upon receiving the generation request for the first storage area,
      generates the first storage area,
      adds management data in which information about the first storage area and the data control policy applied to the first storage area are associated with each other, to the storage area management information, and controls the first storage area, based on the storage area management information.

3. The computer system according to claim 2, wherein the data control policy includes the first scheme of executing the data redundancy processing and the data capacity saving processing, the second scheme with the data control function deactivated, and a third scheme of executing the data redundancy processing.

4. The computer system according to claim 3, wherein the processor determines from the at least one storage device, one storage area management node that manages the storage area, when the data control policy is the first scheme, determines from the at least one storage device, a plurality of storage area management nodes that manage the storage area, when the data control policy is the second scheme, and determines from the at least one storage device, a storage area management node that manages the storage area, based on any suitable algorithm, when the data control policy is the third scheme.

5. The computer system according to claim 3, wherein the data redundancy processing of the first scheme is data redundancy processing using Erasure Coding, the data capacity saving processing of the first scheme is at least any one of deduplication processing and compression processing, and the data redundancy processing of the third scheme is data redundancy processing using any one of Erasure Coding and Mirroring.

6. The computer system according to claim 1, wherein the at least storage device holds storage area management information for storing management data in which the storage area and the data control policy applied to the storage area are associated with each other, and the processor monitors a state of the at least storage device, when a movement event for a second storage area provided to a second data management node of the plurality of data management nodes is detected as a result of the monitoring, refers to the storage area management information, determines from the at least one storage device, a storage area management node that manages the at least one storage device to be a movement destination of the second storage area, based on the data control policy applied to the second storage area, and transmits a movement instruction for the second storage area, to one of the at least one storage device that is a source in which the second storage area is arranged and to one of the at least one storage device that is the movement destination.

7. A data management method for a computer system including: at least one storage device that provides a storage area to one of a plurality of data management nodes having a data protection function for achieving availability of a system providing a service and having a data control function for the storage area, at least one input/output device, and at least one processor that manages arrangement of the storage area and a data control policy applied to the storage area, the data management method comprising:

identifying a target volume, acquiring first setting information about the availability of the system providing the service and performance of the service and determining the data control policy applied to the storage area, based on the first setting information;

determining if the data control policy is a first scheme;

determining if a deduplication pattern of the target volume is synchronized with a volume IO, when the data control policy is the first scheme, determining if the target volume includes duplicate data, when the deduplication pattern of the target volume is synchronized, executing a data capacity saving process, when the target volume includes duplicate data, and executing data redundancy processing in the target volume; and when the data control policy is not the first scheme, determining if the data control policy is a second scheme, writing data in the target volume when the data control policy is the second scheme, and when the data control policy is not the second scheme, executing an other data redundancy processing in the target volume and writing data in the target volume.

8. The data management method according to claim 7, wherein the at least storage device holds storage area management information for managing the storage area, determining, by the processor, from the at least one storage device, upon receiving a generation request for a first storage area from a first data management node of the plurality of data management nodes, a storage area management node that manages the storage device in which the first storage area is arranged, the generation request including the first setting information;

determining, by the control unit, the data control policy applied to the first storage area, based on the first setting information; and transmitting, by the control unit, the generation request for the first storage area to the determined storage area management node, the generation request including the data control policy, setting, by the determined storage area management unit, the data control function, based on the data control policy, upon receiving the generation request for the first storage area;

generating, by the determined storage area management node, the first storage area;

adding, by the determined storage area management node, management data in which information about the first storage area and the data control policy applied to the first storage area are associated with each other, to the storage area management information; and controlling, by the determined storage area management node, the first storage area, based on the storage area management information.

9. The data management method according to claim 8, wherein the data control policy includes the first scheme of executing data redundancy processing and the data capacity saving processing, the second scheme with the data control function deactivated, and a third scheme of executing the data redundancy processing.

10. The data management method according to claim 9, wherein the determining, from the at least one storage device, a storage area management unit in which the storage area is arranged comprises:

determining, by the processor, from the storage area management units, one storage area management node that manages the storage area, when the data control policy is the first scheme;

determining, by the processor, from the at least one storage device area management unite, a plurality of storage area management nodes that manage the storage area, when the data control policy is the second scheme; and determining, by the processor, from the at least one storage device, a storage area management nodes that manages the storage area, based on any suitable algorithm, when the data control policy is the third scheme.

11. The data management method according to claim 9, wherein the data redundancy processing of the first scheme is data redundancy processing using Erasure Coding, the data capacity saving processing of the first scheme is at least any one of deduplication processing and compression processing, and the data redundancy processing of the third scheme is data redundancy processing using any one of Erasure Coding and Mirroring.

12. The data management method according to claim 7, wherein the at least storage device holds storage area management information for storing management data in which the storage area and the data control policy applied to the storage area are associated with each other, and the data management method comprises:

monitoring, by the processor, a state of the at least storage device;

when a movement event for a second storage area provided to a second data management node of the plurality of data management nodes is detected as a result of the monitoring, referring to, by the processor, the storage area management information, determining, by the processor, from the at least one storage device, a storage area management node that manages the storage device to be a movement destination of the second storage area, based on the data control policy applied to the second storage area; and transmitting, by the processor, a movement instruction for the second storage area, to one of the at least one storage device that is a source in which the second storage area is arranged and to one of the at least one storage device that is the movement destination.

\* \* \* \* \*